US011933183B2

(12) United States Patent
Tsunekawa et al.

(10) Patent No.: US 11,933,183 B2
(45) Date of Patent: Mar. 19, 2024

(54) STEAM TURBINE VALVE ABNORMALITY MONITORING SYSTEM, STEAM TURBINE VALVE DRIVE DEVICE, STEAM TURBINE VALVE DEVICE, AND STEAM TURBINE PLANT

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Takuhiro Tsunekawa, Yokohama Kanagawa (JP); Yuichi Nakamura, Yokohama Kanagawa (JP); Hisashi Goto, Kawasaki Kanagawa (JP); Hiroyuki Miya, Yokohama Kanagawa (JP)

(73) Assignees: KABUSHIKI KAISHA TOSHIBA, Tokyo (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 19 days.

(21) Appl. No.: 17/347,056

(22) Filed: Jun. 14, 2021

(65) Prior Publication Data

US 2021/0388735 A1 Dec. 16, 2021

(30) Foreign Application Priority Data

Jun. 15, 2020 (JP) ................................ 2020-103243

(51) Int. Cl.
*F01D 17/26* (2006.01)
*F01D 17/14* (2006.01)
*F01D 21/18* (2006.01)

(52) U.S. Cl.
CPC ........... *F01D 17/26* (2013.01); *F01D 17/145* (2013.01); *F01D 21/18* (2013.01); *F05D 2220/31* (2013.01); *F05D 2270/094* (2013.01)

(58) Field of Classification Search
CPC ........ F01D 17/145; F01D 17/26; F01D 21/18; F05D 2220/31; F05D 2270/094
See application file for complete search history.

(56) References Cited

U.S. PATENT DOCUMENTS 4,585,205 A * 4/1986 Coppola ................ F01D 21/18 91/363 R
9,217,446 B2 * 12/2015 Ohtsuka ................. F15B 1/024
(Continued)

FOREIGN PATENT DOCUMENTS

JP S63-069703 U 5/1988
JP 2012-102855 A 5/2012
(Continued)

*Primary Examiner* — David E Sosnowski
*Assistant Examiner* — Jason G Davis
(74) *Attorney, Agent, or Firm* — Foley & Lardner LLP

(57) ABSTRACT

A steam turbine valve abnormality monitoring system according to an embodiment includes a detection unit detecting the state of a steam turbine valve or a steam turbine valve drive device, a determination unit, and an abnormality processing unit. Based on the detected result of the detection unit, the determination unit determines whether or not an abnormality has occurred in the opening degree control of the steam turbine valve. The abnormality processing unit issues an alarm or issues a turbine stop command when the determination unit determines that an abnormality has occurred in the opening degree control of the steam turbine valve.

6 Claims, 9 Drawing Sheets

(56) References Cited

U.S. PATENT DOCUMENTS

| | | | |
|---|---|---|---|
| 9,938,851 | B2 | 4/2018 | Okamura et al. |
| 10,871,080 | B2 * | 12/2020 | Tsunekawa ........... F16K 31/122 |

FOREIGN PATENT DOCUMENTS

| | | | |
|---|---|---|---|
| JP | 2015-048742 | A | 3/2015 |
| JP | 2016-070500 | A | 5/2016 |
| JP | 2017-061912 | A | 3/2017 |
| JP | 2017-160890 | A | 9/2017 |
| JP | 2018-123732 | A | 8/2018 |
| JP | 2018-131923 | A | 8/2018 |

* cited by examiner

STEAM TURBINE VALVE ABNORMALITY MONITORING SYSTEM, STEAM TURBINE VALVE DRIVE DEVICE, STEAM TURBINE VALVE DEVICE, AND STEAM TURBINE PLANT

CROSS-REFERENCE TO RELATED APPLICATIONS

This application is based upon and claims the benefit of priority from Japanese Patent Application No. 2020-103243, filed Jun. 15, 2020; the entire contents of which are incorporated herein by reference.

FIELD

Embodiments of the present invention relate to a steam turbine valve abnormality monitoring system, a steam turbine valve drive device, a steam turbine valve device, and a steam turbine plant.

BACKGROUND

Generally, the opening degree of each steam turbine valve in a steam turbine plant is controlled by a corresponding steam turbine valve drive device. This controls the inflow amount of steam flowing into the steam turbine, and adjusts the rotation speed and output of the steam turbine.

When an abnormality occurs in a steam turbine plant, a steam turbine valve drive device performs a rapidly closing operation of rapidly closing the steam turbine valve. This blocks the steam flow path for leading the steam to the steam turbine, and stops the steam turbine. Thus, the equipment constituting the steam turbine plant is protected.

Such a steam turbine valve drive device is configured to supply and discharge hydraulic oil to and from a cylinder housing a piston. The pressure of the hydraulic oil supplied to the cylinder drives the piston to control the opening/closing operation of the steam turbine valve.

Each steam turbine valve drive device is sometimes supplied with hydraulic oil from one intensive hydraulic pressure generation device. In this case, the one intensive hydraulic pressure generation device and each steam turbine valve drive device are connected via hydraulic oil piping.

On the other hand, a steam turbine valve drive device in which each steam turbine valve drive device is equipped with a hydraulic pressure generation device without using such an intensive hydraulic pressure generation device is known. In such a steam turbine valve drive device, a bidirectional pump is disposed to an oil passage connecting a load side oil chamber and an unload side oil chamber partitioned by a piston, and the bidirectional pump is driven by a servomotor. By controlling the rotation speed of the servomotor, supply and discharge of the hydraulic oil to and from each oil chamber are switched to control the pressure of the hydraulic oil in each oil chamber. Thus, the opening degree of the steam turbine valve is controlled.

When a rapidly closing operation of the steam turbine valve is performed, the hydraulic oil in the load side oil chamber is discharged by the action of a closing spring. More specifically, the load side oil chamber and the unload side oil chamber are communicated with each other by operating the rapidly closing solenoid valve. Then, the hydraulic oil in the load side oil chamber is discharged to the unload side oil chamber by the load of the closing spring. Therefore, the valve body loaded with the closing spring moves, and the steam turbine valve can be closed rapidly.

Thus, the steam turbine valve drive device equipped with the hydraulic pressure generation device can reduce or eliminate the need of the hydraulic oil piping. It is also possible to reduce on-site work processes such as piping construction of hydraulic oil piping and flushing. Furthermore, the steam turbine valve drive device equipped with the hydraulic pressure generation device can reduce usage of hydraulic oil compared with the case of using the intensive hydraulic pressure generation device.

In the steam turbine valve drive device equipped with such a hydraulic pressure generation device, it is desirable to improve reliability at the time of occurrence of abnormality, in order to prevent breakage of components and to prevent leakage of hydraulic oil.

DETAILED DESCRIPTION

Figure 1:
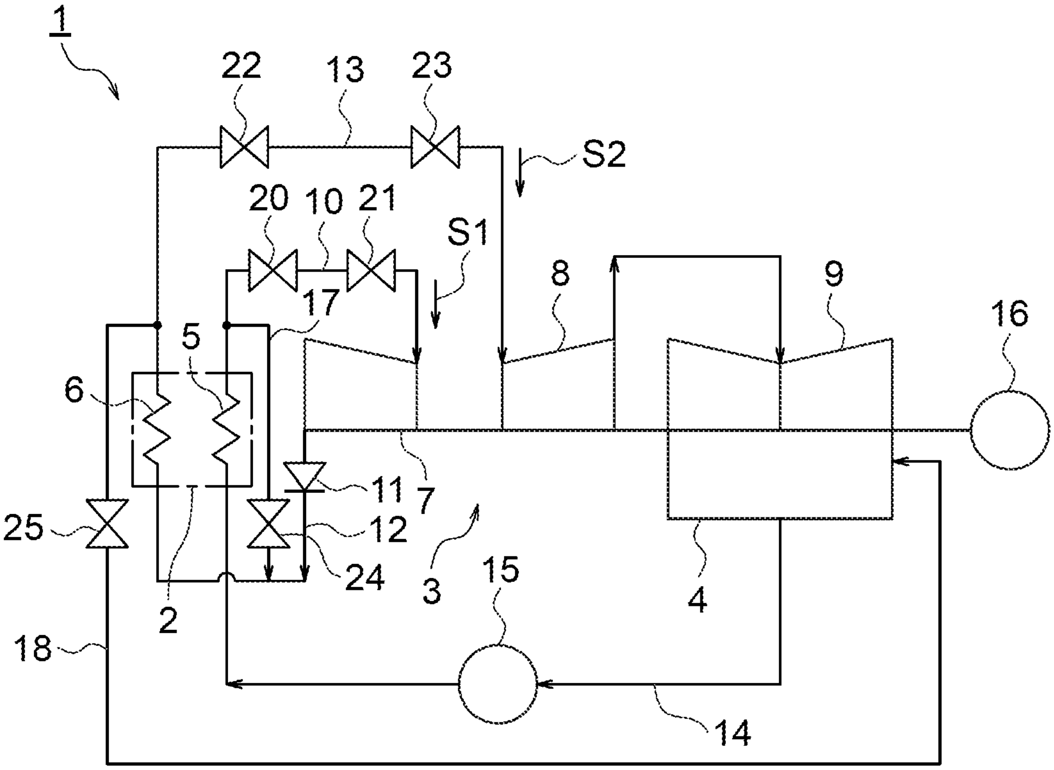
FIG. 1 is a system diagram illustrating an example of a steam turbine plant according to a first embodiment.

A steam turbine valve abnormality monitoring system according to an embodiment monitors an abnormality in opening degree control of a steam turbine valve driven by a steam turbine valve drive device. A steam turbine valve drive device includes: a cylinder housing a piston disposed on an operating rod operating a steam turbine valve and having a load side oil chamber and an unload side oil chamber partitioned by the piston; a bidirectional pump selectively supplying hydraulic oil to the load side oil chamber and the unload side oil chamber; a servomotor driving the bidirectional pump; a control unit controlling the servomotor; and an oil storage unit supplied with the hydraulic oil leaked from the bidirectional pump. A steam turbine valve abnormality monitoring system includes a detection unit detecting the state of a steam turbine valve or a steam turbine valve drive device, a determination unit, and an abnormality processing unit. Based on the detected result of the detection unit, the determination unit determines whether or not an abnormality has occurred in the opening degree control of the steam turbine valve. The abnormality processing unit issues an alarm or issues a turbine stop command when the determination unit determines that an abnormality has occurred in the opening degree control of the steam turbine valve.

The steam turbine valve drive device according to an embodiment drives the steam turbine valve. A steam turbine valve drive device includes: a cylinder housing a piston disposed on an operating rod operating a steam turbine valve and having a load side oil chamber and an unload side oil chamber partitioned by the piston; a bidirectional pump selectively supplying hydraulic oil to the load side oil chamber and the unload side oil chamber; a servomotor driving the bidirectional pump; a control unit controlling the servomotor; an oil storage unit supplied with the hydraulic oil leaked from the bidirectional pump; and the above-described steam turbine valve abnormality monitoring system.

The steam turbine valve device according to an embodiment includes a steam turbine valve and the above-described steam turbine valve drive device driving the steam turbine valve.

A steam turbine plant according to an embodiment includes: a boiler generating steam; a steam turbine obtaining a rotational drive force by the steam generated by the boiler; a condenser condensing the steam discharged from the steam turbine; and above-described steam turbine valve device controlling the flow of the steam generated by the boiler.

A steam turbine valve abnormality monitoring system, a steam turbine valve drive device, a steam turbine valve device, and a steam turbine plant according to an embodiment of the present invention will be described below with reference to the drawings.

First Embodiment

The steam turbine valve abnormality monitoring system, the steam turbine valve drive device, the steam turbine valve device, and the steam turbine plant according to the present embodiment will be described with reference to FIGS. 1 and 2. Here, first, an example of the steam turbine plant to which the steam turbine valve abnormality monitoring system, the steam turbine valve drive device, and the steam turbine valve device according to the present embodiment can be applied will be described with reference to FIG. 1. Hereinafter, the "steam turbine valve abnormality monitoring system" is simply referred to as an "abnormality monitoring system".

As illustrated in FIG. 1, a steam turbine plant 1 includes a boiler 2 generating steam, a steam turbine 3 obtaining a rotational drive force by steam generated in the boiler 2, and a condenser 4 condensing steam discharged from the steam turbine 3.

The boiler 2 has a steam generator 5 generating steam by heating condensate supplied from the condenser 4, and a reheater 6 reheating main steam S1 which has performed expansion work in a high-pressure turbine 7 described later. The boiler 2 generates combustion gas by mixing supplied fuel with air and burning the mixture, generates steam from condensate in the steam generator 5 by heat of the generated combustion gas, and reheats steam in the reheater 6.

The steam turbine 3 has a high-pressure turbine 7, a intermediate-pressure turbine 8, and a low-pressure turbine 9. The turbine rotor of the high-pressure turbine 7, the turbine rotor of the intermediate-pressure turbine 8, and the turbine rotor of the low-pressure turbine 9 (none illustrated) are connected to one another.

The steam generated in the steam generator 5 is supplied as the main steam S1 to the high-pressure turbine 7 via a main steam line 10 (example of a steam flow path). The main steam line 10 has a main steam stop valve 20 and a steam regulating valve 21 disposed on a downstream side of the main steam stop valve 20. Of these, the main steam stop valve 20 is a valve for stopping the flow of the main steam S1 mainly in an emergency of the steam turbine 3, but, in some cases, adjusts the flow rate of the main steam Si. The steam regulating valve 21 is a valve for adjusting the flow rate of the main steam S1 supplied mainly to the high-pressure turbine 7. The high-pressure turbine 7 is rotationally driven by using the main steam S1 supplied from the steam generator 5. That is, the main steam S1 supplied to the high-pressure turbine 7 performs expansion work, and the high-pressure turbine 7 obtains a rotational drive force. The main steam S1 which has performed the expansion work is supplied to the reheater 6 through a low-temperature reheat line 12 having a check valve 11.

The steam reheated in the reheater 6 is supplied as reheat steam S2 to the intermediate-pressure turbine 8 via a reheat steam line 13 (example of a steam flow path). The reheat steam line 13 has a reheat steam stop valve 22 and an intercept valve 23 (reheat steam regulating valve) disposed on a downstream side of the reheat steam stop valve 22. Of these, the reheat steam stop valve 22 is a valve for stopping the flow of the reheat steam S2 mainly in an emergency of the steam turbine 3, but, in some cases, adjusts the flow rate of the reheat steam S2. The intercept valve 23 is a valve for adjusting the flow rate of the reheat steam S2 supplied mainly to the intermediate-pressure turbine 8. The reheat steam S2 supplied to the intermediate-pressure turbine 8 performs expansion work, and the intermediate-pressure turbine 8 obtains a rotational drive force. The reheat steam S2 which has performed expansion work is supplied to the low-pressure turbine 9 and performs further expansion work, and is then supplied to the condenser 4 as turbine exhaust gas.

The turbine exhaust gas supplied to the condenser 4 is condensed into condensate. The condenser 4 and the steam generator 5 of the boiler 2 are coupled by a water supply line 14, and this water supply line 14 has a water supply pump 15. Due to this, the condensate in the condenser 4 is pressurized by the water supply pump 15 and supplied to the steam generator 5 of the boiler 2.

The steam turbine plant 1 further includes a generator 16 generating power by the rotational drive force of the steam turbine 3. As described above, by obtaining the rotational drive force of the high-pressure turbine 7, the intermediate-pressure turbine 8, and the low-pressure turbine 9, the generator 16 is driven to generate power.

A high-pressure turbine bypass line 17 is branched from a portion of the above-described main steam line 10 on an upstream side of the main steam stop valve 20. This high-pressure turbine bypass line 17 has a high-pressure turbine bypass valve 24 and joins the low-temperature reheat line 12. Thus, the main steam S1 can be supplied to the low-temperature reheat line 12 without being supplied to the high-pressure turbine 7. For example, when the pressure or temperature of the main steam S1 has not reached a predetermined value at the time of starting the turbine or the like, or when the flow rate of the main steam S1 has become excessive at the time of interrupting the load or the like, an operation of opening the high-pressure turbine bypass valve 24 and supplying the surplus main steam S1 to the low-temperature reheat line 12 is performed.

A low-pressure turbine bypass line 18 is branched from a portion of the reheat steam line 13 on an upstream side of the reheat steam stop valve 22. This low-pressure turbine bypass line 18 has a low-pressure turbine bypass valve 25 and is coupled to the condenser 4. Thus, the reheat steam S2 can be supplied to the condenser 4 without being supplied to the intermediate-pressure turbine 8 and the low-pressure turbine 9. For example, similarly to the high-pressure turbine bypass valve 24, when the pressure or temperature of the reheat steam S2 has not reached a predetermined value at the time of starting the turbine or the like, or when the flow rate of the reheat steam S2 has become excessive at the time of interrupting the load or the like, an operation of opening the low-pressure turbine bypass valve 25 and supplying the surplus reheat steam S2 to the condenser 4 is performed.

Since such the high-pressure turbine bypass line 17 and the low-pressure turbine bypass line 18 are provided, a circulation operation of the boiler alone is made possible without supplying steam to the steam turbine 3.

Thus, in the steam turbine plant 1, a flow of the steam generated in the boiler 2 is formed toward various pieces of equipment. The steam flow in such the steam turbine plant 1 is controlled by a steam turbine valve device 30. As illustrated in FIG. 2, the steam turbine valve device 30 includes a steam turbine valve 31 having a valve body 34, and a steam turbine valve drive device 40 driving opening/closing of the valve body 34 of the steam turbine valve 31 by using high-pressure hydraulic oil.

Next, the steam turbine valve 31 according to the present embodiment will be described with reference to FIG. 2. Examples of the steam turbine valve 31 according to the present embodiment include the main steam stop valve 20, the steam regulating valve 21, the reheat steam stop valve 22, the intercept valve 23, the high-pressure turbine bypass valve 24, and the low-pressure turbine bypass valve 25 in the steam turbine plant 1 described above.

Figure 2:
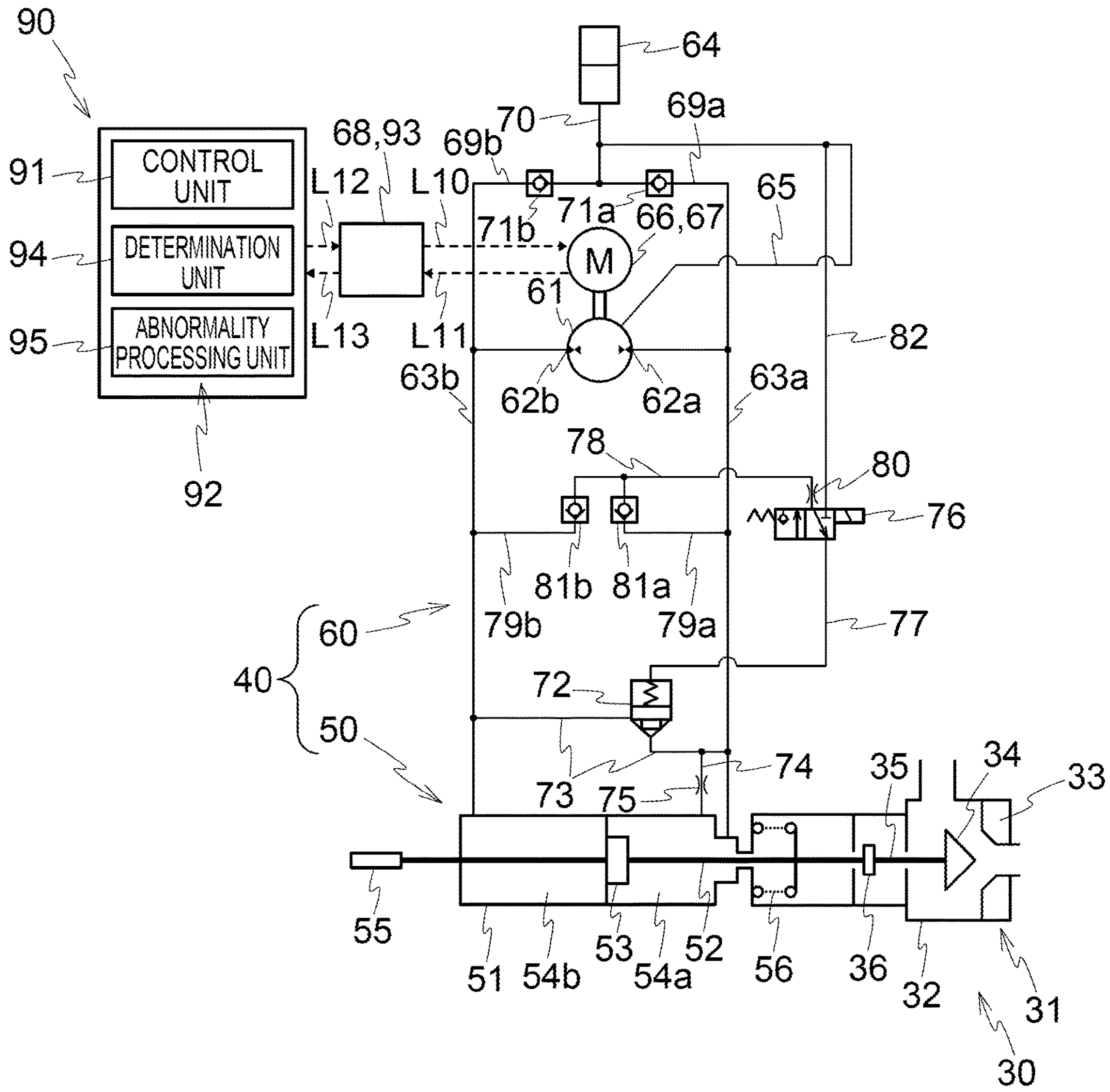
FIG. 2 is a diagram illustrating a steam turbine valve abnormality monitoring system according to the first embodiment.

As illustrated in FIG. 2, the steam turbine valve 31 according to the present embodiment includes a valve casing 32, a valve seat 33 disposed in the valve casing 32, and the valve body 34 disposed in a contactable and separable manner with respect to the valve seat 33. A valve stem 35 is integrally connected to the valve body 34. The valve stem 35 is coupled to the steam turbine valve drive device 40 via a coupling 36. The steam turbine valve drive device 40 allows the valve body 34 to move back and forth with respect to the valve seat 33. When the steam turbine valve 31 is in a closed state, the valve body 34 abuts on the valve seat 33. When the steam turbine valve 31 is in an opened state, the valve body 34 is separated from the valve seat 33 (see FIG. 2).

Next, the steam turbine valve drive device 40 according to the present embodiment will be described with reference to FIG. 2.

The steam turbine valve drive device 40 according to the present embodiment is a device for driving the steam turbine valve 31 installed in the above-described steam flow path for supplying steam to the steam turbine 3.

The steam turbine valve drive device 40 includes a hydraulic drive unit 50, a hydraulic circuit unit 60, a control device 90, and an abnormality monitoring system 92. The hydraulic circuit unit 60 drives the hydraulic drive unit 50, and thus the steam turbine valve 31 performs an opening/closing operation.

The hydraulic drive unit 50 is attached to the steam turbine valve 31. The hydraulic drive unit 50 mainly includes a cylinder 51 and an operating rod 52.

The cylinder 51 houses a piston 53 disposed on the operating rod 52 operating the steam turbine valve 31. This piston 53 partitions the internal space of the cylinder 51 into a load side oil chamber **54*a* and an unload side oil chamber 54*b*. The piston 53 is slidable along the axial direction of the operating rod 52 in the internal space. The cylinder 51 is attached to the steam turbine valve 31**.

The load side oil chamber **54*a* is positioned in the internal space of the cylinder 51 on a side of the valve body 34 of the steam turbine valve 31 relative to the piston 53. The load side oil chamber 54*a* is filled with hydraulic oil for opening the steam turbine valve 31**.

The unload side oil chamber **54*b* is positioned in the internal space of the cylinder 51 on an opposite side (on the side of an opening degree detector 55 described later) to the valve body 34 relative to the piston 53. The unload side oil chamber 54*b* is filled with hydraulic oil for closing the steam turbine valve 31**.

One end of the operating rod 52 is coupled to the valve stem 35 via the coupling 36 described above. The opening degree detector 55 is connected to the other end of the operating rod 52. The opening degree detector 55 is configured to detect the opening degree of the steam turbine valve 31.

With such configuration of the hydraulic drive unit 50, the hydraulic oil is supplied to the load side oil chamber **54*a* when the steam turbine valve 31 is opened. At this time, hydraulic oil is discharged from the unload side oil chamber 54*b* by the action of a bidirectional pump 61 described later. Due to this, the piston 53 moves to the side opposite to the valve body 34 by the differential pressure between the load side oil chamber 54*a* and the unload side oil chamber 54*b*. Therefore, the valve body 34 is separated from the valve seat 33, and the steam turbine valve 31 is opened. On the other hand, when the steam turbine valve 31 is closed, hydraulic oil is supplied to the unload side oil chamber 54*b*. At this time, hydraulic oil is discharged from the load side oil chamber 54*a* by the action of the bidirectional pump 61. Due to this, the piston 53 moves to the side of the valve body 34 by the differential pressure between the load side oil chamber 54*a* and the unload side oil chamber 54*b*. Therefore, the valve body 34 abuts on the valve seat 33, and the steam turbine valve 31 is closed. When the opening degree of the steam turbine valve 31 is retained, the pressure of the load side oil chamber 54*a* and the pressure of the unload side oil chamber 54*b* are adjusted so that the piston 53** stops at a desired position.

The operating rod 52 receives load of a closing spring 56. The closing spring 56 presses the operating rod 52 toward the valve body 34 side of the steam turbine valve 31. Thus, the operating rod 52 is biased toward the direction of closing the steam turbine valve 31.

The hydraulic circuit unit 60 includes the bidirectional pump 61, an oil storage unit 64, supply check valves **71*a* and 71*b*, a rapidly closing dump valve 72, a rapidly closing solenoid valve 76, and pilot check valves 80*a* and 80*b***. These components are connected via an oil passage through which hydraulic oil flows.

The bidirectional pump 61 is configured to selectively supply hydraulic oil to the load side oil chamber **54*a* and the unload side oil chamber 54*b*. The bidirectional pump 61 may be, for example, a reversible rotary side pump. The bidirectional pump 61** can switch the flow direction of hydraulic oil.

The bidirectional pump 61 has a load side pump port **62*a* and an unload side pump port 62*b*. The load side pump port 62*a* is connected to the load side oil chamber 54*a* via a load side oil passage 63*a*. The unload side pump port 62*b* is connected to the unload side oil chamber 54*b* via an unload side oil passage 63***b*. For example, when the bidirectional pump 61 forms a flow of hydraulic oil from the unload side pump port 62*b* to the load side pump port 62*a*, the hydraulic oil is discharged from the load side pump port 62*a* and the hydraulic oil is supplied to the load side oil chamber 54*a*. Due to this, the piston 53 moves to the side opposite to the valve body 34, and the steam turbine valve 31 is opened. In this case, the hydraulic oil in the unload side oil chamber 54*b* is sucked into the unload side pump port 62*b*. On the other hand, when the bidirectional pump 61 forms a flow of hydraulic oil from the load side pump port 62*a* to the unload side pump port 62*b*, the hydraulic oil is discharged from the unload side pump port 62*b* and the hydraulic oil is supplied to the unload side oil chamber 54*b*. Due to this, the piston 53 moves to the side of the valve body 34, and the steam turbine valve 31 is closed. In this case, the hydraulic oil in the load side oil chamber 54*a* is sucked into the load side pump port 62*a*.

The oil storage unit 64 is connected to the bidirectional pump 61 via a first drain oil passage 65. The hydraulic oil leaked from the bidirectional pump 61 is supplied to the oil storage unit 64 through the first drain oil passage 65. One end of the first drain oil passage 65 is connected to the oil storage unit 64 via an oil storage unit oil passage 70 described later, and the other end of the first drain oil passage 65 is connected to the bidirectional pump 61. Thus, the hydraulic oil leaked from the bidirectional pump 61 is supplied to the oil storage unit 64 through the oil storage unit oil passage 70.

The bidirectional pump 61 is driven by a servomotor 66. The drive shaft of the servomotor 66 is coupled to the drive shaft of the bidirectional pump 61. When the servomotor 66 switches the rotation direction of the drive shaft, the flow direction of the hydraulic oil of the bidirectional pump 61 is switched. The servomotor 66 adjusts the rotation speed of the drive shaft, whereby the discharge amount of the hydraulic oil of the bidirectional pump 61 is adjusted.

The servomotor 66 includes a rotation speed detector 67 detecting the rotation speed of the drive shaft. The rotation speed detector 67 may be, for example, a resolver or an encoder.

A servo driver 68 driving the servomotor 66 is connected to the servomotor 66. The servomotor 66 and the servo driver 68 are connected by a motor power line L10 and a motor signal line L11. The drive power output from the servo driver 68 is input as a control signal to the servomotor 66 via the motor power line L10. The drive shaft of the servomotor 66 rotates at a rotation speed corresponding to the frequency of the drive power. On the other hand, the actual rotation speed detected by the rotation speed detector 67 of the servomotor 66 is input as a detection signal to the servo driver 68 via the motor signal line L11.

A control unit 91 (described later) of a control device 90 controlling the servo driver 68 is connected to the servo driver 68. The servo driver 68 and the control device 90 are connected by a rotation speed signal line L12 and a driver signal line L13.

The command rotation speed output from the control unit 91 is input as a control signal to the servo driver 68 via the rotation speed signal line L12. The servo driver 68 supplies drive power to the servomotor 66 based on the command rotation speed received from the control unit 91. More specifically, the servo driver 68 supplies, to the servomotor 66, drive power of a frequency corresponding to the command rotation speed. The servo driver 68 may perform feedback control of the servomotor 66. More specifically, the servo driver 68 performs feedback control of the servomotor 66 based on the command rotation speed received from the control unit 91 and the actual rotation speed received from the servomotor 66. That is, the servo driver 68 adjusts the frequency of the drive power to the servomotor 66 so that the rotation speed of the drive shaft of the servomotor 66 becomes the command rotation speed in consideration of the deviation between the command rotation speed and the actual rotation speed.

The oil storage unit 64 stores hydraulic oil. The oil storage unit 64 may be an accumulator. The oil storage unit 64 is connected to the load side oil passage 63*a* via a load side supply oil passage 69*a*, and connected to the unload side oil passage 63*b* via an unload side supply oil passage 69*b*. More specifically, the oil storage unit oil passage 70 is connected to the oil storage unit 64. One end of the load side supply oil passage 69*a* is connected to the oil storage unit oil passage 70, and one end of the unload side supply oil passage 69*b* is connected to the oil storage unit oil passage 70. The other end of the load side supply oil passage 69*a* is connected to the load side oil passage 63*a*. The other end of the unload side supply oil passage 69*b* is connected to the unload side oil passage 63*b*. Thus, the hydraulic oil stored in the oil storage unit 64 is supplied to the load side oil passage 63*a* through the oil storage unit oil passage 70 and the load side supply oil passage 69*a*, and is supplied to the unload side oil passage 63*b* through the oil storage unit oil passage 70 and the unload side supply oil passage 69*b*.

The load side supply check valve 71*a* is disposed to the load side supply oil passage 69*a*. The load side supply check valve 71*a* is configured to permit the flow of hydraulic oil from the oil storage unit oil passage 70 to the load side oil passage 63*a*, but to block the flow of hydraulic oil from the load side oil passage 63*a* to the oil storage unit oil passage 70.

The unload side supply check valve 71*b* is disposed to the unload side supply oil passage 69*b*. The unload side supply check valve 71*b* is configured to permit the flow of hydraulic oil from the oil storage unit oil passage 70 to the unload side oil passage 63*b*, but to block the flow of hydraulic oil from the unload side oil passage 63*b* to the oil storage unit oil passage 70.

The rapidly closing dump valve 72 is disposed to a first rapidly closing oil passage 73. One end of the first rapidly closing oil passage 73 is connected to the load side oil passage 63*a*, and the other end of the first rapidly closing oil passage 73 is connected to the unload side oil passage 63*b*.

Pilot oil is supplied to the rapidly closing dump valve 72 from the rapidly closing solenoid valve 76. When the pilot oil is supplied, the rapidly closing dump valve 72 is closed. When the pilot oil is discharged, the rapidly closing dump valve 72 is opened. In a normal time, pilot oil is supplied to the rapidly closing dump valve 72, and the rapidly closing dump valve 72 is closed. This blocks the flow of hydraulic oil in the first rapidly closing oil passage 73. In an emergency, pilot oil is discharged from the rapidly closing dump valve 72, and the rapidly closing dump valve 72 is opened. This permits the flow of hydraulic oil from the load side oil chamber 54*a* to the unload side oil chamber 54*b*, and the hydraulic oil in the load side oil chamber 54*a* is rapidly discharged. Note that while the pilot oil is a hydraulic oil, a name different from the hydraulic oil will be used as the hydraulic oil for controlling the rapidly closing dump valve 72 for the sake of clarity of explanation.

A portion of the first rapidly closing oil passage 73 on the side of the load side oil passage 63*a* relative to the rapidly closing dump valve 72 is connected to the load side oil chamber 54*a* via a second rapidly closing oil passage 74.

The port of the load side oil chamber 54_a_ to which the second rapidly closing oil passage 74 is connected is different from the port of the load side oil chamber 54_a_ to which the load side oil passage 63_a_ is connected. An orifice 75 is disposed in the load side oil chamber 54_a_.

The rapidly closing solenoid valve 76 controls pilot oil supplied to the rapidly closing dump valve 72. The rapidly closing solenoid valve 76 discharges hydraulic oil from the load side oil chamber 54_a_ in an emergency. The rapidly closing solenoid valve 76 is connected to the rapidly closing dump valve 72 via a first pilot oil passage 77. One end of the first pilot oil passage 77 is connected to the rapidly closing solenoid valve 76, and the other end of the first pilot oil passage 77 is connected to the rapidly closing dump valve 72.

The rapidly closing solenoid valve 76 is connected to the load side oil passage 63_a_ and the unload side oil passage 63_b_ via a second pilot oil passage 78. More specifically, the second pilot oil passage 78 is connected to the load side oil passage 63_a_ via a load side pilot oil passage 79_a,_ and is connected to the unload side oil passage 63_b_ via an unload side pilot oil passage 79_b_. One end of the second pilot oil passage 78 is connected to the rapidly closing solenoid valve 76, and the other end of the second pilot oil passage 78 is connected to the load side pilot oil passage 79_a_ and the unload side pilot oil passage 79_b_. An orifice 80 is disposed in the second pilot oil passage 78. One end of the load side pilot oil passage 79_a_ is connected to the second pilot oil passage 78, and the other end of the load side pilot oil passage 79_a_ is connected to the load side oil passage 63_a_. One end of the unload side pilot oil passage 79_b_ is connected to the second pilot oil passage 78, and the other end of the unload side pilot oil passage 79_b_ is connected to the unload side oil passage 63_b_.

In an excited state, the rapidly closing solenoid valve 76 permits the flow of pilot oil from the load side oil passage 63_a_ and the unload side oil passage 63_b_ to the rapidly closing dump valve 72. On the other hand, in a non-excited state, the rapidly closing solenoid valve 76 blocks the flow of pilot oil from the load side oil passage 63_a_ and the unload side oil passage 63_b_ to the rapidly closing dump valve 72. Instead, the rapidly closing solenoid valve 76 in the non-excited state permits the flow of pilot oil from the rapidly closing dump valve 72 to a second drain oil passage 82 described later.

In a normal time, the rapidly closing solenoid valve 76 is brought into an excited state, and permits the flow of pilot oil from the load side oil passage 63_a_ and the unload side oil passage 63_b_ to the rapidly closing dump valve 72. Due to this, pilot oil is supplied to the rapidly closing dump valve 72, and the rapidly closing dump valve 72 is closed. In an emergency, the rapidly closing solenoid valve 76 becomes non-excited, and permits the flow of pilot oil from the rapidly closing dump valve 72 to the second drain oil passage 82 described later. Due to this, the pilot oil is discharged from the rapidly closing dump valve 72, and the rapidly closing dump valve 72 is opened. The hydraulic oil is discharged from the load side oil chamber 54_a_.

A load side pilot check valve 81_a_ is disposed to the load side pilot oil passage 79_a_. The load side pilot check valve 81_a_ is configured to permit the flow of pilot oil from the load side oil passage 63_a_ to the rapidly closing solenoid valve 76, but to block the flow of pilot oil from the rapidly closing solenoid valve 76 to the load side oil passage 63_a_.

An unload side pilot check valve 81_b_ is disposed to the unload side pilot oil passage 79_b_. The unload side pilot check valve 81_b_ is configured to permit the flow of pilot oil from the unload side oil passage 63_b_ to the rapidly closing solenoid valve 76, but to block the flow of pilot oil from the rapidly closing solenoid valve 76 to the unload side oil passage 63_b_.

The hydraulic oil leaked from the rapidly closing dump valve 72 and the hydraulic oil leaked from the rapidly closing solenoid valve 76 are supplied to the oil storage unit 64 described above. More specifically, the rapidly closing solenoid valve 76 is connected to the first drain oil passage 65 via the second drain oil passage 82. One end of the second drain oil passage 82 is connected to the first drain oil passage 65, and the other end of the second drain oil passage 82 is connected to the rapidly closing solenoid valve 76. The rapidly closing solenoid valve 76 and the rapidly closing dump valve 72 are connected by the first pilot oil passage 77 described above. Via these oil passages, the hydraulic oil leaked from the rapidly closing dump valve 72 and the hydraulic oil leaked from the rapidly closing solenoid valve 76 are supplied to the oil storage unit 64 through the oil storage unit oil passage 70.

The control device 90 includes the control unit 91. The control unit 91 controls the above-described servo driver 68 and the rapidly closing solenoid valve 76.

A command opening degree value of the steam turbine valve 31 is input as a detection signal to the control unit 91 from a high-order control device of the steam turbine plant 1. The control unit 91 is configured to input a control signal for controlling the position of the valve body 34 of the steam turbine valve 31 to the servo driver 68 based on this command opening degree value. For example, based on the command opening degree value described above, the control unit 91 may calculate the command rotation speed of the servomotor 66 and input it to the servo driver 68 via the rotation speed signal line L12 described above. At this time, the control unit 91 may perform feedback control of the servo driver 68 using the detected opening degree value of the steam turbine valve 31 detected by the opening degree detector 55 described above. In this case, the detected opening degree value detected by the opening degree detector 55 is input to the control unit 91 via an opening degree signal line L14 (see FIG. 3). The control unit 91 obtains a deviation between the opening degree command value of the steam turbine valve 31 and the detected opening degree value. The command rotation speed to be input to the servo driver 68 may be adjusted so as to reduce this deviation.

The control unit 91 controls the rapidly closing solenoid valve 76 based on the opening degree command value to be input as described above. For example, when opening the steam turbine valve 31, the control unit 91 inputs the excitation power as a control signal to a coil (not illustrated) of the rapidly closing solenoid valve 76. This brings the rapidly closing solenoid valve 76 into an excited state. On the other hand, when closing the steam turbine valve 31, the excitation power is stopped. This brings the rapidly closing solenoid valve 76 into a non-excited state.

The abnormality monitoring system 92 according to the present embodiment is a device monitoring an abnormality in the opening degree control of the steam turbine valve 31 configured as described above.

The abnormality monitoring system 92 includes a detection unit 93, a determination unit 94, and an abnormality processing unit 95.

The detection unit 93 detects the state of a steam turbine valve 31 or the steam turbine valve drive device 40. The detection unit 93 according to the present embodiment detects the state of the servo driver 68 as an example of the state of the steam turbine valve drive device 40. More specifically, the detection unit 93 detects whether the servo driver 68 is in an ON state or whether the servo driver 68 is in an OFF state. Such the detection unit 93 may be incorporated in the servo driver 68.

That is, the servo driver 68 performs feedback control of the servomotor 66 based on the command rotation speed received from the control unit 91 and the actual rotation speed received from the servomotor 66, as described above. The servo driver 68 is configured to be switchable between the ON state, where this feedback control is performed, and the OFF state, where this feedback control is not performed. In a normal time, the servo driver 68 is in the ON state and performs feedback control. In an abnormal time, the servo driver 68 is switched to the OFF state. The servo driver 68 has a protection function of switching to the OFF state when an abnormality occurs in the servo driver 68 itself and its peripheral components.

A condition for switching to the OFF state is, for example, a case where an abnormality occurs in a power supply system (not illustrated) that supplies power to the servomotor 66. In this case, the presence or absence of an abnormality occurrence in the power supply system may be recognized by monitoring the power input to the servo driver 68. Another condition for switching to the OFF state is, for example, a case where an abnormality occurs in the motor power line L10. In this case, the presence or absence of an abnormality occurrence in the motor power line L10 may be recognized by monitoring the power output from the servo driver 68. Another condition for switching to the OFF state is, for example, a case where an abnormality occurs in the motor signal line L11. In this case, the presence or absence of an abnormality occurrence in the motor signal line L11 may be recognized by monitoring the actual rotation speed input to the servo driver 68 as a detection signal. Another condition for switching to the OFF state is, for example, a case where an abnormality occurs in the servo driver 68 itself. When at least one of such conditions occurs, the protection function of the servo driver 68 operates, and the servo driver 68 is switched to the OFF state.

The detection unit 93 incorporated in the servo driver 68 is configured to detect whether the servo driver 68 is in the ON state or whether the servo driver 68 is in the OFF state. The detected state is input to the determination unit 94 as a detection signal. For example, when the servo driver 68 is in the ON state, a detection signal indicative of being in the ON state is input from the detection unit 93 to the determination unit 94 via the driver signal line L13. When the servo driver 68 is in the OFF state, a detection signal indicative of being in the OFF state is input from the detection unit 93 to the determination unit 94 via the driver signal line L13.

The determination unit 94 determines whether or not an abnormality has occurred in the opening degree control of the steam turbine valve 31 based on the state of the steam turbine valve drive device 40 detected by the detection unit 93. The determination unit 94 according to the present embodiment determines whether or not an abnormality has occurred in the opening degree control of the steam turbine valve 31 based on the detection signal input from the detection unit 93. For example, when the detection unit 93 detects that the servo driver 68 is in the OFF state, the determination unit 94 determines that an abnormality has occurred in the opening degree control of the steam turbine valve 31. On the other hand, when the detection unit 93 detects that the servo driver 68 is in the ON state, the determination unit 94 determines that no abnormality has occurred in the opening degree control of the steam turbine valve 31.

The abnormality processing unit 95 performs abnormality processing when the determination unit 94 determines that an abnormality has occurred in the opening degree control of the steam turbine valve 31. As an example of the abnormality processing, the abnormality processing unit 95 may issue an alarm. For example, the abnormality processing unit 95 may generate an alarm sound or an alarm announcement, or may turn on or blink an alarm display. As another example of the abnormality processing, the abnormality processing unit 95 may issue a stop command of the steam turbine 3. For example, the abnormality processing unit 95 may issue a stop command for closing another steam turbine valve positioned on an upstream side of the steam flow path in which the steam turbine valve 31 corresponding to the steam turbine valve drive device 40 where the abnormality has occurred is installed. In this case, the steam turbine valve drive device corresponding to the steam turbine valve receiving the stop command is driven, and the steam turbine valve is closed. Alternatively, the abnormality processing unit 95 may issue a command to the rapidly closing solenoid valve 76 so as to discharge hydraulic oil from the load side oil chamber 54*a*. For example, the abnormality processing unit 95 may issue a command for releasing the excitation of the rapidly closing solenoid valve 76 of the steam turbine valve drive device 40 where an abnormality has occurred. In this case, a stop command for closing the steam turbine valve 31 may be issued from the abnormality processing unit 95 to the control unit 91. Due to this, the control unit 91 brings the rapidly closing solenoid valve 76 into a non-excited state. Therefore, the hydraulic oil in the load side oil chamber 54*a* of the steam turbine valve drive device 40 is discharged to the unload side oil chamber 54*b*, and the steam turbine valve 31 is rapidly closed.

The above-described determination unit 94 and the abnormality processing unit 95 may be incorporated in the control device 90. That is, the control device 90 according to the present embodiment may include the control unit 91, the determination unit 94, and the abnormality processing unit 95.

Next, an abnormality monitoring method in the abnormality monitoring system 92 according to the present embodiment having such a configuration will be described.

During operation of the steam turbine plant 1, various detection signals in the steam turbine plant 1 are input to the control unit 91 of the control device 90. The control unit 91 controls the position of the valve body 34 of the steam turbine valve 31 based on these detection signals. More specifically, the control unit 91 inputs a control signal for controlling the position of the valve body 34 to the servo driver 68 of the steam turbine valve drive device 40. For example, the control unit 91 calculates the command rotation speed of the servomotor 66 based on the detection signal, and inputs it to the servo driver 68 via the rotation speed signal line L12. On the other hand, the servo driver 68 performs feedback control in consideration of the actual rotation speed of the drive shaft of the servomotor 66 input from the servomotor 66. That is, the servo driver 68 adjusts the frequency of the drive power to the servomotor 66 based on the command rotation speed and the actual rotation speed.

The servo driver 68 inputs drive power to the servomotor 66 via the motor power line L10. The servomotor 66 rotates the drive shaft in accordance with the drive power having been input. The rotation speed of the driving shaft of the servomotor 66 is detected by the rotation speed detector 67 of the servomotor 66. The detected actual rotation speed is input to the servo driver 68 via the motor signal line L11. Thus, the servo driver 68 continues the feedback control.

During such feedback control, the servomotor 66 is in the ON state. The detection unit 93 incorporated in the servo driver 68 detects that the servo driver 68 is in the ON state, and inputs a detection signal indicating that the servo driver 68 is in the ON state to the determination unit 94 of the abnormality monitoring system 92 via the driver signal line L13. When the detection signal indicating that the servo driver 68 is in the ON state is input, the determination unit 94 determines that no abnormality has occurred in the opening degree control of the steam turbine valve 31. In this case, the abnormality processing unit 95 of the abnormality monitoring system 92 does not perform abnormality processing such as issuing an alarm.

On the other hand, when an abnormality occurs in the servo driver 68 itself or components around the servo driver 68, the servo driver 68 is switched to the OFF state, where feedback control is not performed by the protection function.

When the servo driver 68 is switched to the OFF state, the detection unit 93 incorporated in the servo driver 68 detects that the servo driver 68 is in the OFF state. Then, a detection signal indicating that the servo driver 68 is in the OFF state is input to the determination unit 94 of the abnormality monitoring system 92 via the driver signal line L13. When the detection signal indicating that the servo driver 68 is in the OFF state is input, the determination unit 94 determines that an abnormality has occurred in the opening degree control of the steam turbine valve 31.

When it is determined that an abnormality has occurred in the opening degree control of the steam turbine valve 31, the abnormality processing unit 95 of the abnormality monitoring system 92 performs abnormality processing. For example, the abnormality processing unit 95 may generate an alarm sound or an alarm announcement, or may turn on or blink an alarm display. This makes it possible to notify the operator of an abnormality having occurred in the opening degree control of the steam turbine valve 31. Alternatively, a stop command of the steam turbine 3 may be issued. For example, another steam turbine valve positioned on an upstream side of the steam turbine valve 31 corresponding to the steam turbine valve drive device 40 determined to have occurred the abnormality may be closed. This blocks the flow of steam to the steam turbine 3, and it is possible to stop the steam turbine 3. Furthermore, the rapidly closing solenoid valve 76 of the steam turbine valve drive device 40 determined to have occurred an abnormality may be brought into a non-excited state. In this case, the steam turbine valve 31 closes rapidly. Also in this case, the flow of steam to the steam turbine 3 is blocked, and it is possible to stop the steam turbine 3.

When the servo driver 68 is brought into the OFF state, it becomes difficult to control the rotation speed of the servomotor 66, and it becomes difficult to control the opening degree of the steam turbine valve 31. In this case, it becomes impossible to adjust the amount of steam flowing into the steam turbine 3, and it becomes difficult to control the rotation speed and the power generation output of the steam turbine 3.

On the other hand, according to the present embodiment, when the servo driver 68 is brought into the OFF state, it is possible to determine that an abnormality has occurred in the opening degree control of the steam turbine valve 31. This allows the abnormality processing unit 95 of the abnormality monitoring system 92 to perform abnormality processing such as issuing an alarm. When an alarm is issued, it is possible to notify the operator that the control of the opening degree of the steam turbine valve 31 has been disabled. Thereafter, the steam turbine 3 can be safely stopped by the operator. In addition, the steam turbine 3 can be safely stopped also when the abnormality processing unit 95 issues a stop command of the steam turbine 3.

When the servo driver 68 is brought into the OFF state, the steam turbine valve 31 can be closed by the closing spring 56 in some cases. That is, when the load of the closing spring 56 overcomes the pressure of the hydraulic oil in the load side oil chamber 54*a*, the steam turbine valve 31 can be closed by the load of the closing spring 56. In this case, the steam turbine valve 31 can be safely stopped.

Thus, according to the present embodiment, the state of the steam turbine valve drive device 40 is detected by the detection unit 93, and based on the detected state of the steam turbine valve drive device 40, it is determined whether or not an abnormality has occurred in the opening degree control of the steam turbine valve 31. When it is determined that an abnormality has occurred in the opening degree control of the steam turbine valve 31, the abnormality processing unit 95 performs abnormality processing to issue an alarm or issue a stop command of the steam turbine 3. Therefore, when an abnormality occurs in the opening degree control of the steam turbine valve 31, the steam turbine 3 can be safely stopped, and reliability can be improved.

In the present embodiment described above, an example of determining that an abnormality has occurred in the opening degree control of the steam turbine valve 31 when the servo driver 68 is brought into the OFF state has been described. However, the present invention is not limited to this. For example, the determination unit 94 may determine whether or not an abnormality has occurred in the opening degree control of the steam turbine valve 31 based on the current value of the drive power supplied from the servo driver 68 to the servomotor 66.

More specifically, the detection unit 93 is configured to detect, as an example of the state of the steam turbine valve drive device 40, the current value of the drive power supplied from the servo driver 68 to the servomotor 66. Such the detection unit 93 may be incorporated in the servo driver 68. The determination unit 94 determines whether or not an abnormality has occurred in the opening degree control of the steam turbine valve 31 based on the detected current value of the drive power output from the servo driver 68. When the detected current value is smaller than a specified value, the determination unit 94 determines that no abnormality has occurred in the opening degree control of the steam turbine valve 31. On the other hand, when the detected current value is equal to or greater than the specified value, the determination unit 94 determines that an abnormality has occurred in the opening degree control of the steam turbine valve 31. When the determination unit 94 determines that an abnormality has occurred in the opening degree control of the steam turbine valve 31, the abnormality processing unit 95 performs the abnormality processing in the same manner as in the first embodiment.

For example, if an oxide scale accumulates in the internal flow path of the steam turbine valve 31, there is a risk that the oxide scale becomes resistance to the opening/closing operation of the steam turbine valve 31, thereby causing a problem in the opening/closing operation. Also when seizure has occurred in the bearing portion of the bidirectional pump 61 or the servomotor 66, there is a risk of a problem caused in the opening/closing operation of the steam turbine valve 31. In such a case, the torque of the servomotor 66 can increase when the opening degree of the steam turbine valve 31 is adjusted. Also in the hydraulic feedback control state, the servomotor 66 continues to be driven in order to compensate for leakage of the hydraulic oil in the oil chambers 54*a* and 54*b*. However, the torque of the servomotor 66 can increase when seizure has occurred in the bearing portion of the bidirectional pump 61 or the servomotor 66.

On the other hand, when the current value of the drive power supplied from the servo driver 68 to the servomotor 66 is equal to or greater than the specified value, it is possible to determine that an abnormality has occurred in the opening degree control of the steam turbine valve 31. This enables the abnormality processing unit 95 of the abnormality monitoring system 92 to perform abnormality processing and to issue an alarm. When an alarm is issued, it is possible to notify the operator that an abnormality occurs in the torque of the servomotor 66 and there is a concern about damage to the bidirectional pump 61, the servo driver 68, and the like. Thereafter, the steam turbine 3 can be safely stopped by the operator. In addition, the steam turbine 3 can be safely stopped also when the abnormality processing unit 95 issues a stop command of the steam turbine 3.

By monitoring the current value of the drive power supplied to the servomotor 66 as described above, it is possible to confirm the soundness of the components of the steam turbine valve drive device 40.

Since the torque of the servomotor 66 is proportional to the current value of the drive power supplied to the servomotor 66, an increase in torque causes an increase in the current value. This current value can increase when the rotation speed of the servomotor 66 is increased. Therefore, by limiting the torque of the servomotor 66 within a range where the opening/closing operation of the steam turbine valve 31 does not cause a problem, it is possible to reduce the drive power consumed by the servomotor 66 and to reduce the power supply capacity.

Second Embodiment

Next, the steam turbine valve abnormality monitoring system, the steam turbine valve drive device, the steam turbine valve device, and the steam turbine plant according to the second embodiment will be described with reference to FIG. 3.

Figure 3:
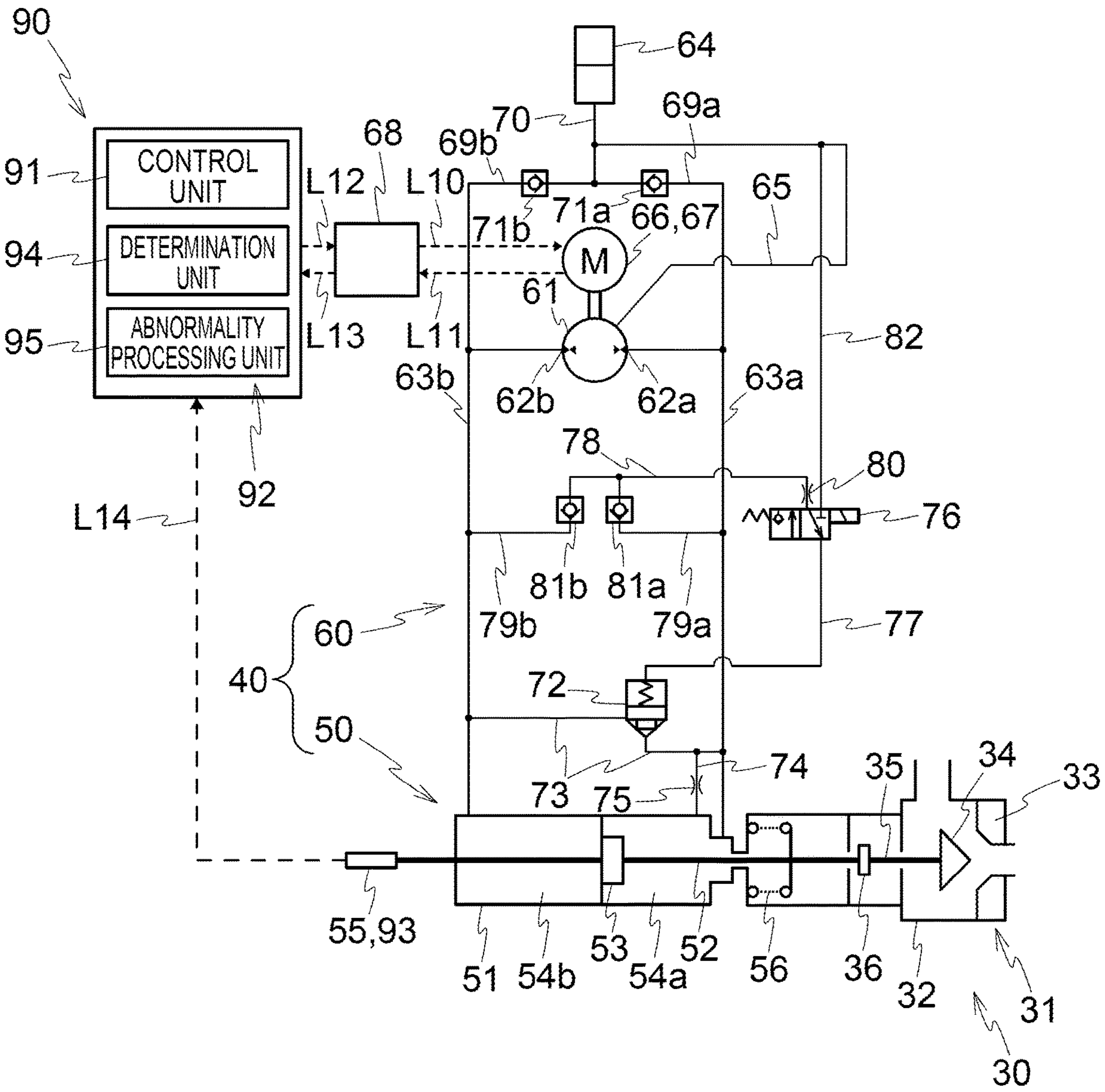
FIG. 3 is a diagram illustrating a steam turbine valve abnormality monitoring system according to a second embodiment.

In the second embodiment illustrated in FIG. 3, a main different from the first embodiment illustrated in FIGS. 1 and 2 lies in that it is determined that an abnormality has occurred in the opening degree control of the steam turbine valve when the deviation between the command opening degree value and the detected opening degree value of the steam turbine valve is equal to or greater than a specified value. Other configurations are substantially the same as those of the first embodiment illustrated in FIGS. 1 and 2. Note that in FIG. 3, the same parts as those in the first embodiment illustrated in FIGS. 1 and 2 are given the same reference numerals, and detailed description thereof is omitted.

As illustrated in FIG. 3, in the present embodiment, the detection unit 93 includes the above-described opening degree detector 55 detecting the opening degree of the steam turbine valve 31. The detection unit 93 according to the present embodiment detects the opening degree of the steam turbine valve 31 as an example of the state of the steam turbine valve 31. The opening degree detector 55 and the determination unit 94 of the abnormality monitoring system 92 are connected by the opening degree signal line L14. Due to this, the detected opening degree value of the steam turbine valve 31 detected by the opening degree detector 55 is input as a detection signal to the determination unit 94 of the abnormality monitoring system 92 via the opening degree signal line L14.

The determination unit 94 according to the present embodiment determines whether or not an abnormality has occurred in the opening degree control of the steam turbine valve 31 based on the deviation between the above-described command opening degree value of the steam turbine valve 31 input to the control unit 91 of the control device 90 and the detected opening degree value of the steam turbine valve 31 detected by the opening degree detector 55. When the deviation between the command opening degree value and the detected opening degree value is smaller than a specified value, the determination unit 94 determines that no abnormality has occurred in the opening degree control of the steam turbine valve 31. On the other hand, when the deviation between the command opening degree value and the detected opening degree value is equal to or greater than the specified value, the determination unit 94 determines that an abnormality has occurred in the opening degree control of the steam turbine valve 31. The control unit 91 may perform feedback control based on the command opening degree value and the detected opening degree value of the steam turbine valve 31. That is, the control unit 91 may adjust the command rotation speed to be output to the servo driver 68 so that the opening degree of the steam turbine valve 31 becomes the command opening degree value in consideration of the deviation between the command opening degree value and the detected opening degree value.

When the determination unit 94 determines that an abnormality has occurred in the opening degree control of the steam turbine valve 31, the abnormality processing unit 95 performs the abnormality processing in the same manner as in the first embodiment.

For example, when an operation failure occurs in the valve body 34 and the valve stem 35 of the steam turbine valve 31, it becomes difficult to control the opening degree of the steam turbine valve 31. In this case, it becomes impossible to adjust the amount of steam flowing into the steam turbine 3, and it becomes difficult to control the rotation speed and the power generation output of the steam turbine 3. In this case, the deviation between the command opening degree value of the steam turbine valve 31 input to the control unit 91 and the detected opening degree value detected by the opening degree detector 55 becomes large.

On the other hand, according to the present embodiment, when the deviation between the command opening degree value of the steam turbine valve 31 and the detected opening degree value is equal to or greater than the specified value, it is possible to determine that an abnormality has occurred in the opening degree control of the steam turbine valve 31. This allows the abnormality processing unit 95 of the abnormality monitoring system 92 to perform abnormality processing such as issuing an alarm. When an alarm is issued, it is possible to notify the operator that an abnormality has occurred in the opening degree control of the steam turbine valve 31. Thereafter, the steam turbine 3 can be safely stopped by the operator. In addition, the steam turbine 3 can be safely stopped also when the abnormality processing unit 95 issues a stop command of the steam turbine 3.

Third Embodiment

Next, the steam turbine valve abnormality monitoring system, the steam turbine valve drive device, the steam turbine valve device, and the steam turbine plant according to the third embodiment will be described with reference to FIG. 4.

Figure 4:
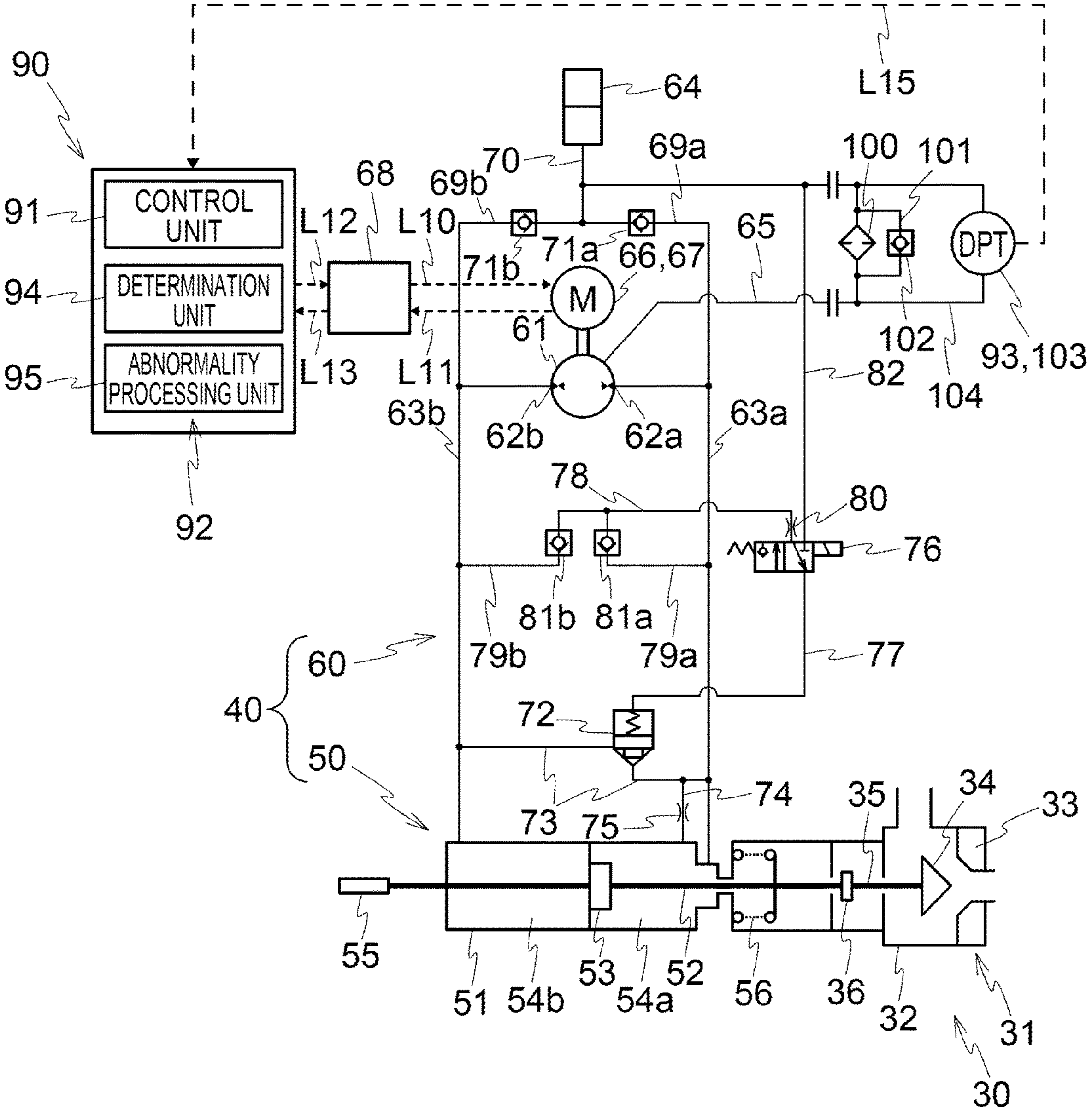
FIG. 4 is a diagram illustrating a steam turbine valve abnormality monitoring system according to a third embodiment.

In the third embodiment illustrated in FIG. 4, a main different from the first embodiment illustrated in FIGS. 1 and 2 lies in that it is determined that an abnormality has occurred in the opening degree control of the steam turbine valve when the differential pressure between the pressure on the upstream side and the pressure on the downstream side of the filter disposed in the first drain oil passage is equal to or greater than a specified value. Other configurations are substantially the same as those of the first embodiment illustrated in FIGS. 1 and 2. Note that in FIG. 4, the same parts as those in the first embodiment illustrated in FIGS. 1 and 2 are given the same reference numerals, and detailed description thereof is omitted.

As illustrated in FIG. 4, in the present embodiment, a filter 100 is disposed in the first drain oil passage 65. The filter 100 is a member for removing foreign matters such as sludge from the hydraulic oil flowing through the first drain oil passage 65.

A filter bypass line 101 bypassing the filter 100 is disposed to the first drain oil passage 65. One end of the filter bypass line 101 is connected to a portion of the first drain oil passage 65 on an upstream side (side of the bidirectional pump 61) relative to the filter 100. The other end of the filter bypass line 101 is connected to a portion of the first drain oil passage 65 on a downstream side (side of the oil storage unit oil passage 70) relative to the filter 100. A filter bypass check valve 102 is disposed to the filter bypass line 101. The filter bypass check valve 102 is configured to permit the flow of hydraulic oil from the bidirectional pump 61 to the oil storage unit oil passage 70, but to block the flow of hydraulic oil from the oil storage unit oil passage 70 to the bidirectional pump 61.

The detection unit 93 according to the present embodiment includes a filter differential pressure detector 103. The filter differential pressure detector 103 is configured to detect a differential pressure (hereinafter referred to as filter differential pressure) between the pressure on the upstream side and the pressure on the downstream side of the filter 100 as an example of the state of the steam turbine valve drive device 40.

More specifically, a differential pressure detection line 104 bypassing the filter 100 and the filter bypass check valve 102 is connected to the first drain oil passage 65. One end of the differential pressure detection line 104 is connected to a portion of the first drain oil passage 65 on an upstream side relative to a connection point on the upstream side between the first drain oil passage 65 and the filter bypass line 101. The other end of the differential pressure detection line 104 is connected to a portion of the first drain oil passage 65 on a downstream side relative to a connection point on the downstream side between the first drain oil passage 65 and the filter bypass line 101.

The above-described filter differential pressure detector 103 is disposed to the differential pressure detection line 104. The filter differential pressure detector 103 is connected to the determination unit 94 of the abnormality monitoring system 92 via a filter differential pressure signal line L15. Due to this, the filter differential pressure detected by the filter differential pressure detector 103 is input as a detection signal to the determination unit 94 of the abnormality monitoring system 92 via the filter differential pressure signal line L15.

The determination unit 94 according to the present embodiment determines whether or not an abnormality has occurred in the opening degree control of the steam turbine valve 31 based on the filter differential pressure detected by the filter differential pressure detector 103. When the filter differential pressure is smaller than a specified value, the determination unit 94 determines that no abnormality has occurred in the opening degree control of the steam turbine valve 31. On the other hand, when the filter differential pressure is equal to or greater than the specified value, the determination unit 94 determines that an abnormality has occurred in the opening degree control of the steam turbine valve 31.

When the determination unit 94 determines that an abnormality has occurred in the opening degree control of the steam turbine valve 31, the abnormality processing unit 95 performs the abnormality processing in the same manner as in the first embodiment.

In general, when hydraulic equipment is operated for a long period of time, sludge is generated, and there is a possibility of causing performance degradation of components such as the bidirectional pump 61, the rapidly closing dump valve 72, and the rapidly closing solenoid valve 76. Sludge can be generated when the temperature of hydraulic oil rises. The temperature of hydraulic oil can increase by pressure loss occurring during a compression process or a throttling flow of the bidirectional pump 61.

In order to remove such sludge, in the steam turbine valve drive device 40 according to the present embodiment, the filter 100 is disposed in the first drain oil passage 65. This can remove the sludge from the hydraulic oil, and it is possible to improve the cleanliness of the hydraulic oil.

When foreign matters such as sludge remain in the filter 100, the filter differential pressure can increase. In this case, there is a concern that the pressure of the portion of the first drain oil passage 65 on an upstream side relative to the filter 100 rises to cause oil leakage. When the filter differential pressure rises, the hydraulic oil can flow to the oil storage unit oil passage 70 through the filter bypass line 101, but the hydraulic oil flows to the oil storage unit oil passage 70 without passing through the filter 100, and hence it is impossible to remove foreign matters from the hydraulic oil. For this reason, there is a concern that the hydraulic oil in which foreign matter are mixed flows through the hydraulic drive unit 50 and the hydraulic circuit unit 60, thereby causing an operation failure of the components.

On the other hand, according to the present embodiment, when the filter differential pressure is equal to or greater than the specified value, it is possible to determine that an abnormality has occurred in the opening degree control of the steam turbine valve 31. This enables the abnormality processing unit 95 of the abnormality monitoring system 92 to perform abnormality processing and to issue an alarm. When an alarm is issued, it is possible to notify the operator that an abnormality has occurred in the filter differential pressure. Thereafter, the steam turbine 3 can be safely stopped by the operator. In this case, the elements of the filter 100 may be replaced. In addition, the steam turbine 3 can be safely stopped also when the abnormality processing unit 95 issues a stop command of the steam turbine 3.

Fourth Embodiment

Next, the steam turbine valve abnormality monitoring system, the steam turbine valve drive device, the steam turbine valve device, and the steam turbine plant according to the fourth embodiment will be described with reference to FIG. 5.

Figure 5:
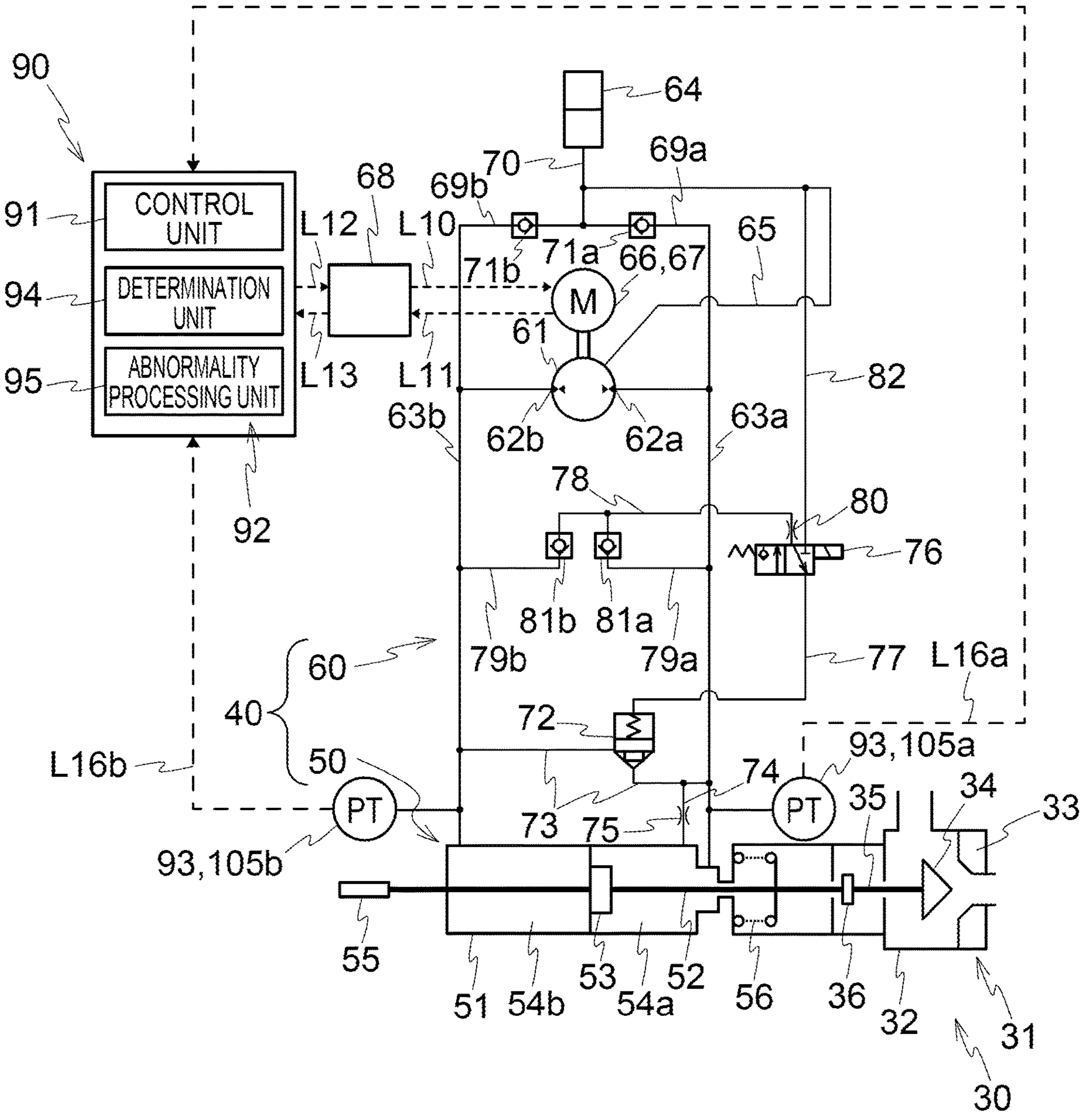
FIG. 5 is a diagram illustrating a steam turbine valve abnormality monitoring system according to a fourth embodiment.

In the fourth embodiment illustrated in FIG. 5, a main different from the first embodiment illustrated in FIGS. 1 and 2 lies in that it is determined that an abnormality has occurred in the opening degree control of the steam turbine valve when the deviation between the target pressure value and the detected pressure value of the oil chamber is equal to or greater than a specified value. Other configurations are substantially the same as those of the first embodiment illustrated in FIGS. 1 and 2. Note that in FIG. 5, the same parts as those in the first embodiment illustrated in FIGS. 1 and 2 are given the same reference numerals, and detailed description thereof is omitted.

As illustrated in FIG. 5, in the present embodiment, the detection unit 93 may include a load side pressure detector 105*a* detecting the pressure in the load side oil chamber 54*a*. The detection unit 93 according to the present embodiment is configured to detect the pressure in the load side oil chamber 54*a* as an example of the state of the steam turbine valve drive device 40. The load side pressure detector 105*a* is disposed to the load side oil passage 63*a*. The load side pressure detector 105*a* and the determination unit 94 of the abnormality monitoring system 92 are connected by a hydraulic signal line L16*a*. Due to this, the detected pressure value of the load side oil passage 63*a* detected by the load side pressure detector 105*a* is input as a detection signal to the determination unit 94 of the abnormality monitoring system 92 via the hydraulic signal line L16*a*.

The determination unit 94 according to the present embodiment may determine whether or not an abnormality has occurred in the opening degree control of the steam turbine valve 31 based on the deviation between the target pressure value of the load side oil chamber 54*a* calculated by the control unit 91 of the control device 90 and the detected pressure value of the load side oil chamber 54*a* detected by the load side pressure detector 105*a*. When the deviation between the target pressure value and the detected pressure value of the load side oil chamber 54*a* is smaller than a specified value, the determination unit 94 determines that no abnormality has occurred in the opening degree control of the steam turbine valve 31. On the other hand, when the deviation between the target pressure value and the detected pressure value of the load side oil chamber 54*a* is equal to or greater than the specified value, the determination unit 94 determines that an abnormality has occurred in the opening degree control of the steam turbine valve 31. The control unit 91 may perform feedback control based on the target pressure value and the detected pressure value of the load side oil chamber 54*a*. That is, the control unit 91 may adjust the command rotation speed to be output to the servo driver 68 so that the opening degree of the steam turbine valve 31 becomes the command opening degree value in consideration of the deviation between the target pressure value and the detected pressure value.

When the determination unit 94 determines that an abnormality has occurred in the opening degree control of the steam turbine valve 31, the abnormality processing unit 95 performs the abnormality processing in the same manner as in the first embodiment.

For example, when the hydraulic pressure of the bidirectional pump 61 decreases due to a failure or the like, the pressure of the load side oil chamber 54*a* decreases, and the deviation between the target pressure value and the detected pressure value of the load side oil chamber 54*a* can increase. Also when an abnormality occurs in the servo driver 68, the deviation between the target pressure value and the detected pressure value of the load side oil chamber 54*a* can increase similarly. In such a case, the opening degree of the steam turbine valve 31 decreases, and it becomes difficult to adjust the amount of steam flowing into the steam turbine 3. Even if the rotation speed of the servomotor 66 is increased, it becomes difficult to reduce the deviation between the target pressure value and the detected pressure value.

On the other hand, according to the present embodiment, when the deviation between the target pressure value and the detected pressure value of the load side oil chamber 54*a* is equal to or greater than the specified value, it is possible to determine that an abnormality has occurred in the opening degree control of the steam turbine valve 31. This enables the abnormality processing unit 95 of the abnormality monitoring system 92 to perform abnormality processing and to issue an alarm. When an alarm is issued, it is possible to notify the operator that an abnormality occurs in the pressure of the hydraulic oil in the load side oil chamber 54*a* and there is a concern about damage to the bidirectional pump 61, the servo driver 68, and the like. Thereafter, the steam turbine 3 can be safely stopped by the operator. In addition, the steam turbine 3 can be safely stopped also when the abnormality processing unit 95 issues a stop command of the steam turbine 3.

The correlation between the pressure of the hydraulic oil in the load side oil chamber 54*a* and the opening degree of the steam turbine valve 31 or the steam pressure in the steam turbine valve 31 may be monitored. In this case, it is possible to evaluate the soundness of the operation of the steam turbine valve 31, the bidirectional pump 61, and the servomotor 66. For example, if an oxide scale accumulates in the internal flow path of the steam turbine valve 31, there is a risk that the oxide scale becomes resistance to the opening/closing operation of the steam turbine valve 31, thereby causing a problem in the opening/closing operation. Also when seizure has occurred in the bearing portion of the bidirectional pump 61 or the servomotor 66, there is a risk of a problem caused in the opening/closing operation of the steam turbine valve 31. In such a case, when the opening degree of the steam turbine valve 31 is adjusted, the pressure of the load side oil chamber 54*a* can increase. Therefore, by monitoring the pressure of the hydraulic oil in the load side oil chamber 54*a*, it is possible to confirm the soundness of the components of the steam turbine valve drive device 40.

The detection unit 93 may include an unload side pressure detector 105*b* detecting the pressure of the unload side oil chamber 54*b*. The detection unit 93 according to the present embodiment is configured to detect the pressure of the unload side oil chamber 54*b* as an example of the state of the steam turbine valve drive device 40. The unload side pressure detector 105*b* is disposed to the unload side oil passage 63*b*. The unload side pressure detector 105*b* and the determination unit 94 of the abnormality monitoring system 92 are connected by a hydraulic signal line L16*b*. Due to this, the detected pressure value of the unload side oil passage 63*b* detected by the unload side pressure detector 105*b* is input as a detection signal to the determination unit 94 of the abnormality monitoring system 92 via the hydraulic signal line L16*b*.

The determination unit 94 may determine whether or not an abnormality has occurred in the opening degree control of the steam turbine valve 31 based on the deviation between the target pressure value of the unload side oil chamber 54*b* calculated by the control unit 91 of the control device 90 and the detected pressure value of the unload side oil chamber 54*b* detected by the unload side pressure detector 105*b*. When the deviation between the target pressure value and the detected pressure value of the unload side oil chamber 54*b* is smaller than a specified value, the determination unit 94 determines that no abnormality has occurred in the opening degree control of the steam turbine valve 31. On the other hand, when the deviation between the target pressure value and the detected pressure value of the unload side oil chamber 54*b* is equal to or greater than the specified value, the determination unit 94 determines that an abnormality has occurred in the opening degree control of the steam turbine valve 31. The control unit 91 may perform feedback control based on the target pressure value and the detected pressure value of the unload side oil chamber 54*b*. That is, the control unit 91 may adjust the command rotation speed to be output to the servo driver 68 so that the opening degree of the steam turbine valve 31 becomes the command opening degree value in consideration of the deviation between the target pressure value and the detected pressure value.

When the determination unit 94 determines that an abnormality has occurred in the opening degree control of the steam turbine valve 31, the abnormality processing unit 95 performs the abnormality processing in the same manner as in the first embodiment.

For example, when the hydraulic pressure of the bidirectional pump 61 decreases due to a failure or the like, the pressure of the unload side oil chamber 54*b* decreases, and the deviation between the target pressure value and the detected pressure value of the unload side oil chamber 54*b* can increase. Also when an abnormality occurs in the servo driver 68, the deviation between the target pressure value and the detected pressure value of the unload side oil chamber 54*b* can increase similarly. In such a case, the opening degree of the steam turbine valve 31 increases, and it becomes difficult to adjust the amount of steam flowing into the steam turbine 3. Even if the rotation speed of the servomotor 66 is increased, it becomes difficult to reduce the deviation between the target pressure value and the detected pressure value.

On the other hand, according to the present embodiment, when the deviation between the target pressure value and the detected pressure value of the unload side oil chamber 54*b* is equal to or greater than the specified value, it is possible to determine that an abnormality has occurred in the opening degree control of the steam turbine valve 31. This enables the abnormality processing unit 95 of the abnormality monitoring system 92 to perform abnormality processing and to issue an alarm. When an alarm is issued, it is possible to notify the operator that an abnormality occurs in the pressure of the hydraulic oil in the unload side oil chamber 54*b* and there is a concern about damage to the bidirectional pump 61, the servo driver 68, and the like. Thereafter, the steam turbine 3 can be safely stopped by the operator. In addition, the steam turbine 3 can be safely stopped also when the abnormality processing unit 95 issues a stop command of the steam turbine 3.

The detection unit 93 of the steam turbine valve abnormality monitoring system 92 may include both the load side pressure detector 105*a* and the unload side pressure detector 105*b*, and the determination unit 94 may determine whether or not an abnormality has occurred in the opening degree control of the steam turbine valve 31 based on both the pressure of the load side oil chamber 54*a* and the pressure of the unload side oil chamber 54*b*.

The correlation between the pressure of the hydraulic oil in the unload side oil chamber 54*b* and the opening degree of the steam turbine valve 31 or the steam pressure in the steam turbine valve 31 may be monitored. In this case, it is possible to evaluate the soundness of the operation of the steam turbine valve 31, the bidirectional pump 61, and the servomotor 66. For example, if an oxide scale accumulates in the internal flow path of the steam turbine valve 31, there is a risk that the oxide scale becomes resistance to the opening/closing operation of the steam turbine valve 31, thereby causing a problem in the opening/closing operation. Also when seizure has occurred in the bearing portion of the bidirectional pump 61 or the servomotor 66, there is a risk of a problem caused in the opening/closing operation of the steam turbine valve 31. In such a case, when the opening degree of the steam turbine valve 31 is adjusted, the pressure of the unload side oil chamber 54*b* can increase. Therefore, by monitoring the pressure of the hydraulic oil in the unload side oil chamber 54*b*, it is possible to confirm the soundness of the components of the steam turbine valve drive device 40.

Fifth Embodiment

Next, the steam turbine valve abnormality monitoring system, the steam turbine valve drive device, the steam turbine valve device, and the steam turbine plant according to the fifth embodiment will be described with reference to FIG. 6.

Figure 6:
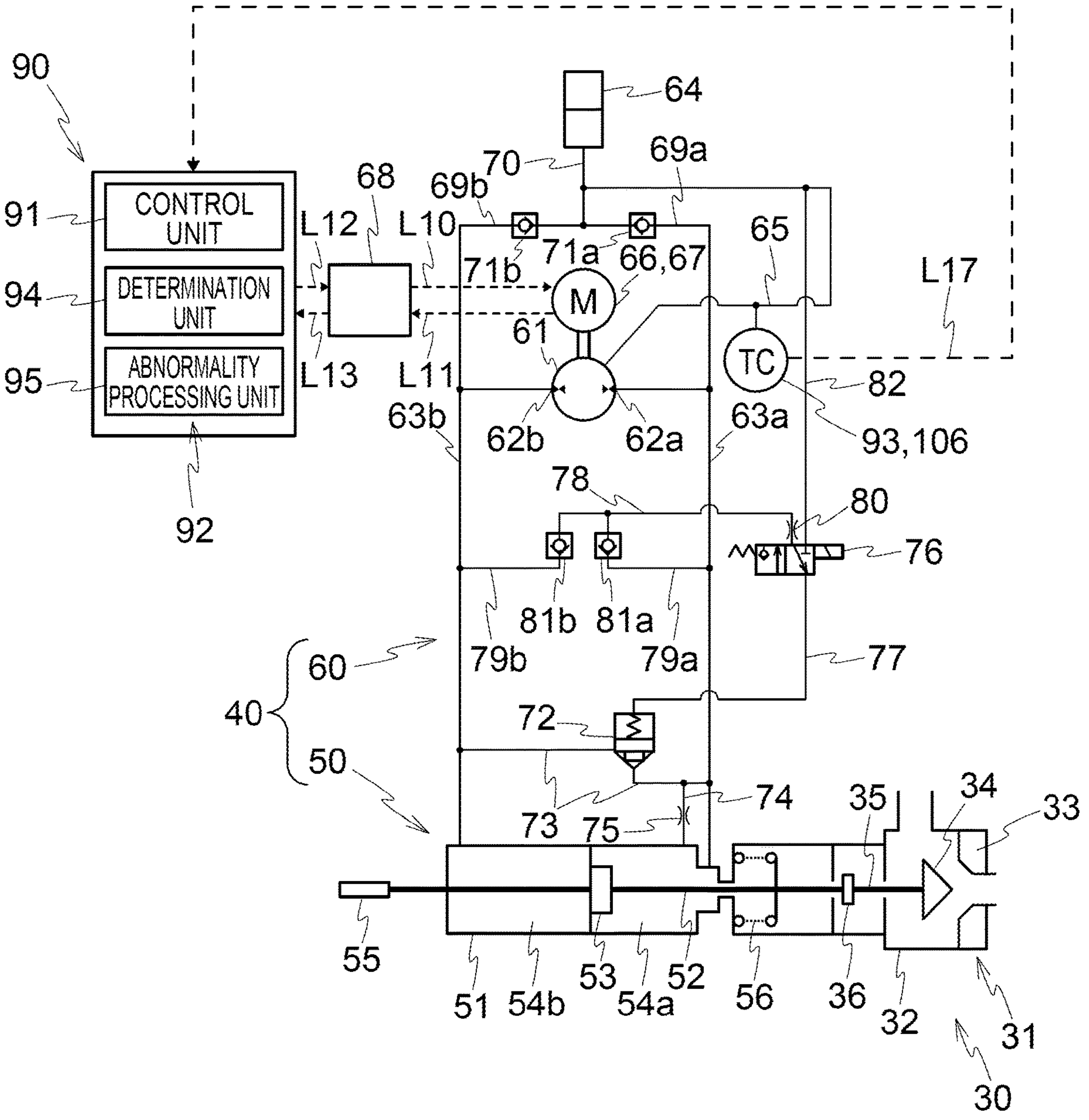
FIG. 6 is a diagram illustrating a steam turbine valve abnormality monitoring system according to a fifth embodiment.

In the fifth embodiment illustrated in FIG. 6, a main different from the first embodiment illustrated in FIGS. 1 and 2 lies in that it is determined that an abnormality has occurred in the opening degree control of the steam turbine valve when the detected temperature value of the hydraulic oil leaked from the bidirectional pump is equal to or greater than a specified value. Other configurations are substantially the same as those of the first embodiment illustrated in FIGS. 1 and 2. Note that in FIG. 6, the same parts as those in the first embodiment illustrated in FIGS. 1 and 2 are given the same reference numerals, and detailed description thereof is omitted.

As illustrated in FIG. 6, in the present embodiment, the detection unit 93 includes a drain oil temperature detector 106 detecting the temperature of the hydraulic oil leaked from the bidirectional pump 61. The detection unit 93 according to the present embodiment is configured to detect the temperature of the hydraulic oil leaked from the bidirectional pump 61 as an example of the state of the steam turbine valve drive device 40. The drain oil temperature detector 106 is disposed to the first drain oil passage 65 and detects the temperature of the hydraulic oil in the first drain oil passage 65. The drain oil temperature detector 106 and the determination unit 94 of the abnormality monitoring system 92 are connected by a drain oil temperature signal line L17. Due to this, the detected temperature value of the drain oil detected by the drain oil temperature detector 106 is input as a detection signal to the determination unit 94 of the abnormality monitoring system 92 via the drain oil temperature signal line L17.

The determination unit 94 according to the present embodiment determines whether or not an abnormality has occurred in the opening degree control of the steam turbine valve 31 based on the detected temperature value of the hydraulic oil detected by the drain oil temperature detector 106. When the detected temperature value is smaller than a specified value, the determination unit 94 determines that no abnormality has occurred in the opening degree control of the steam turbine valve 31. On the other hand, when the detected temperature value is equal to or greater than the specified value, it is determined that an abnormality has occurred in the opening degree control of the steam turbine valve 31.

When the determination unit 94 determines that an abnormality has occurred in the opening degree control of the steam turbine valve 31, the abnormality processing unit 95 performs the abnormality processing in the same manner as in the first embodiment.

In general, the hydraulic oil leaking from the bidirectional pump 61 is hydraulic oil having flowed in with its pressure having been lowered to about atmospheric pressure from a state of being raised to about several MPa. Therefore, the temperature of the hydraulic oil flowed into the first drain oil passage 65 rises rapidly. For example, when the steam turbine valve 31 is fully opened or fully closed, the pressure of the hydraulic oil in the bidirectional pump 61 increases, and hence the temperature rise of this hydraulic oil becomes significant. Such temperature rise of the hydraulic oil can increase the temperature of the bidirectional pump 61 itself and can cause damage to a sealant (not illustrated) in the bidirectional pump 61. For this reason, it is desirable to monitor the temperature of the hydraulic oil in the first drain oil passage 65 from the viewpoint of protecting the components such as the bidirectional pump 61.

On the other hand, according to the present embodiment, when the detected temperature value of the hydraulic oil in the first drain oil passage 65 is equal to or greater than the specified value, it is possible to determine that an abnormality has occurred in the opening degree control of the steam turbine valve 31. This enables the abnormality processing unit 95 of the abnormality monitoring system 92 to perform abnormality processing and to issue an alarm. When an alarm is issued, it is possible to notify the operator that an abnormality of temperature drop of the drain oil occurs and there is a concern about damage to the bidirectional pump 61. Thereafter, the steam turbine 3 can be safely stopped by the operator. In addition, the steam turbine 3 can be safely stopped also when the abnormality processing unit 95 issues a stop command of the steam turbine 3.

Sixth Embodiment

Next, the steam turbine valve abnormality monitoring system, the steam turbine valve drive device, the steam turbine valve device, and the steam turbine plant according to the sixth embodiment will be described with reference to FIG. 7.

Figure 7:
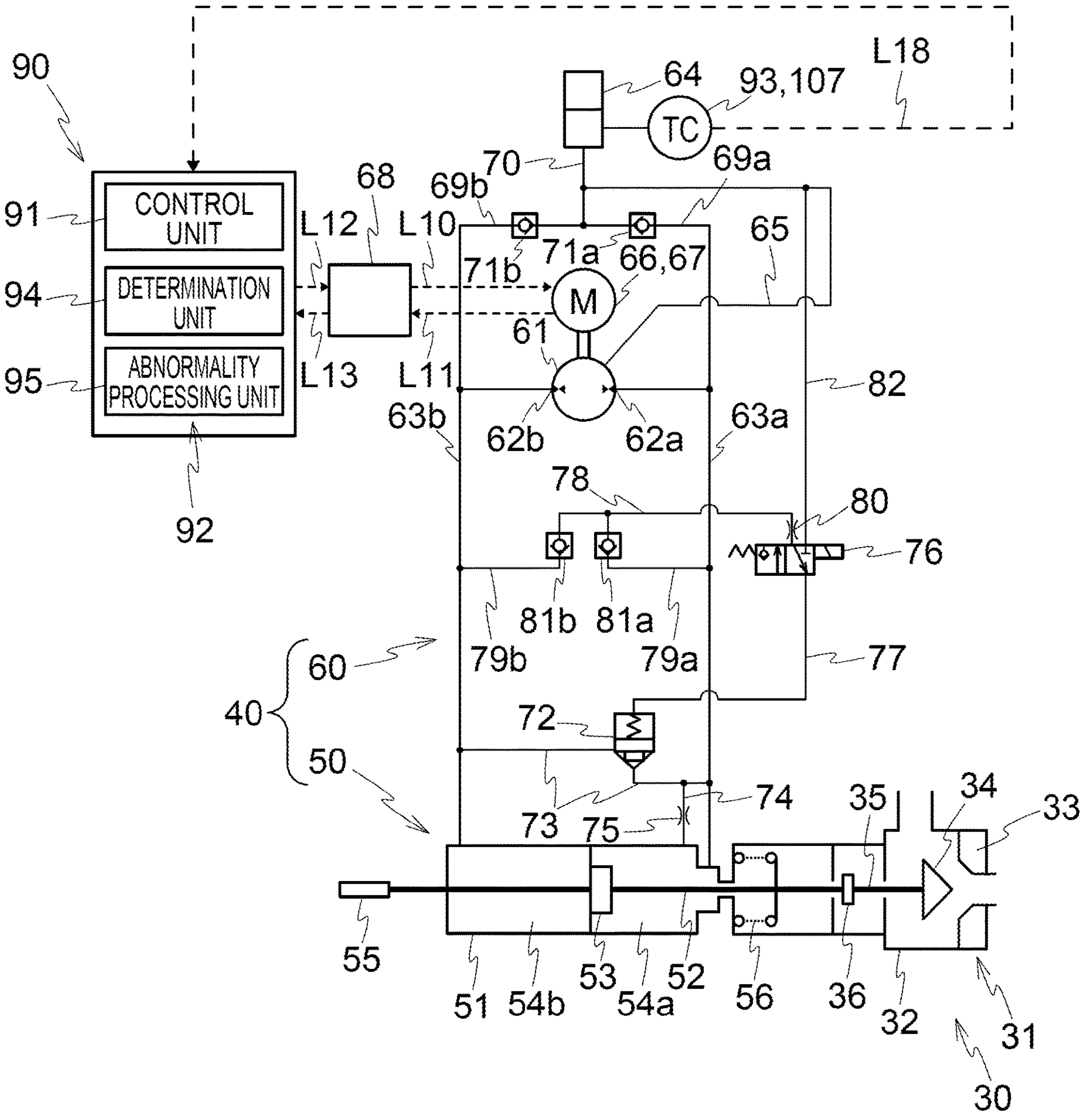
FIG. 7 is a diagram illustrating a steam turbine valve abnormality monitoring system according to a sixth embodiment.

In the sixth embodiment illustrated in FIG. 7, a main different from the first embodiment illustrated in FIGS. 1 and 2 lies in that it is determined that an abnormality has occurred in the opening degree control of the steam turbine valve when the detected temperature value of the hydraulic oil in the oil storage unit is equal to or less than a specified value. Other configurations are substantially the same as those of the first embodiment illustrated in FIGS. 1 and 2. Note that in FIG. 7, the same parts as those in the first embodiment illustrated in FIGS. 1 and 2 are given the same reference numerals, and detailed description thereof is omitted.

As illustrated in FIG. 7, in the present embodiment, the detection unit 93 includes an oil storage temperature detector 107 detecting the temperature of the hydraulic oil in the oil storage unit 64. The detection unit 93 according to the present embodiment is configured to detect the temperature of the hydraulic oil in the oil storage unit 64 as an example of the state of the steam turbine valve drive device 40. The oil storage temperature detector 107 is disposed to the oil storage unit 64. The oil storage temperature detector 107 and the determination unit 94 of the abnormality monitoring system 92 are connected by an oil storage temperature signal line L18. Due to this, the detected temperature value of the hydraulic oil detected by the oil storage temperature detector 107 is input as a detection signal to the determination unit 94 of the abnormality monitoring system 92 via the oil storage temperature signal line L18.

The determination unit 94 according to the present embodiment determines whether or not an abnormality has occurred in the opening degree control of the steam turbine valve 31 based on the detected temperature value of the hydraulic oil detected by the oil storage temperature detector 107. When the detected temperature value is larger than a specified value, the determination unit 94 determines that no abnormality has occurred in the opening degree control of the steam turbine valve 31. On the other hand, when the detected temperature value is equal to or less than the specified value, the determination unit 94 determines that an abnormality has occurred in the opening degree control of the steam turbine valve 31.

When the determination unit 94 determines that an abnormality has occurred in the opening degree control of the steam turbine valve 31, the abnormality processing unit 95 performs the abnormality processing in the same manner as in the first embodiment.

For example, when the steam turbine valve drive device 40 according to the present embodiment is used in cold climates, the temperature of hydraulic oil decreases and the viscosity of hydraulic oil increases. In this case, there is a concern that an overcurrent flows when the servomotor 66 is started, and the servomotor 66 is damaged. In order to protect the servomotor 66 from overcurrent, the servo driver 68 can be brought into the OFF state.

On the other hand, according to the present embodiment, when the detected temperature value of the hydraulic oil in the oil storage unit 64 is equal to or less than the specified value, it is possible to determine that an abnormality has occurred in the opening degree control of the steam turbine valve 31. This enables the abnormality processing unit 95 of the abnormality monitoring system 92 to perform abnormality processing and to issue an alarm. When an alarm is issued, it is possible to notify the operator that an abnormality of temperature drop of the hydraulic oil occurs and the bidirectional pump 61 is in a state of not being able to start. Thereafter, the steam turbine 3 can be safely stopped by the operator. In addition, the steam turbine 3 can be safely stopped also when the abnormality processing unit 95 issues a stop command of the steam turbine 3.

When the temperature of the hydraulic oil in the oil storage unit 64 is equal to or less than the specified value, the servomotor 66 may be prohibited from starting. In this case, it is possible to prevent the servomotor 66 from starting in a state where the viscosity of the hydraulic oil is low, and it is possible to prevent overcurrent from flowing through the servomotor 66.

A heater (not illustrated) heating hydraulic oil may be disposed to the oil storage unit 64. In this case, feedback control of the heater may be performed based on the detected temperature value of the hydraulic oil detected by the oil storage temperature detector 107. For example, the heater may be turned on when the detected temperature value is low, and the heater may be turned off when the detected temperature value is high. Also in this case, it is possible to prevent the viscosity of the hydraulic oil from decreasing, and it is possible to prevent overcurrent from flowing through the servomotor 66 at the time of starting.

Seventh Embodiment

Next, the steam turbine valve abnormality monitoring system, the steam turbine valve drive device, the steam turbine valve device, and the steam turbine plant according to the seventh embodiment will be described with reference to FIG. 8.

Figure 8:
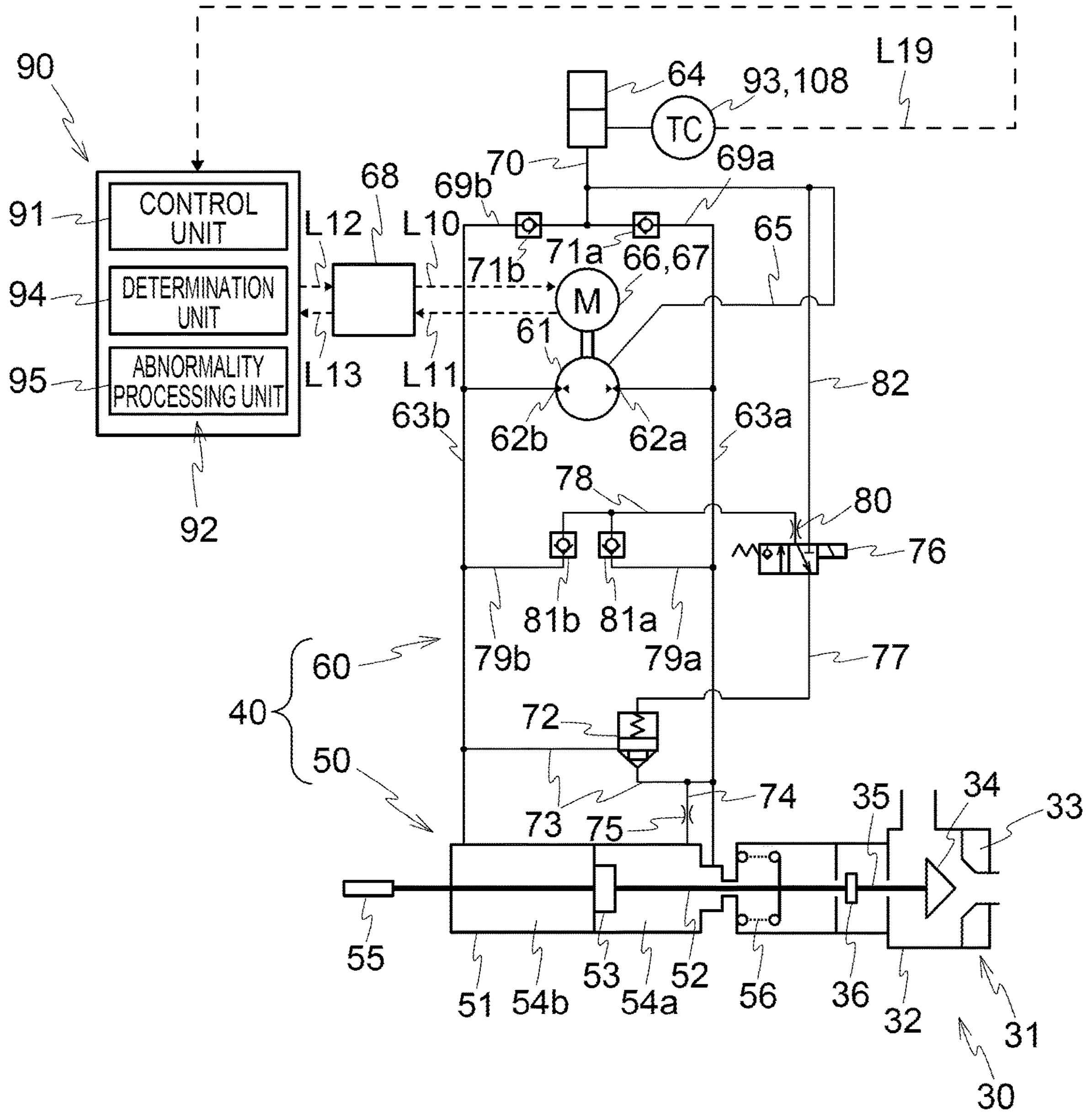
FIG. 8 is a diagram illustrating a steam turbine valve abnormality monitoring system according to a seventh embodiment.

In the seventh embodiment illustrated in FIG. 8, a main different from the first embodiment illustrated in FIGS. 1 and 2 lies in that it is determined that an abnormality has occurred in the opening degree control of the steam turbine valve when the detected pressure value of the hydraulic oil in the oil storage unit is equal to or less than a specified value. Other configurations are substantially the same as those of the first embodiment illustrated in FIGS. 1 and 2. Note that in FIG. 8, the same parts as those in the first embodiment illustrated in FIGS. 1 and 2 are given the same reference numerals, and detailed description thereof is omitted.

As illustrated in FIG. 8, in the present embodiment, the detection unit 93 includes an oil storage pressure detector 108 detecting the pressure of the hydraulic oil in the oil storage unit 64. The detection unit 93 according to the present embodiment is configured to detect the pressure of the hydraulic oil in the oil storage unit 64 as an example of the state of the steam turbine valve drive device 40. The oil storage pressure detector 108 is disposed to the oil storage unit 64. The oil storage pressure detector 108 and the determination unit 94 of the abnormality monitoring system 92 are connected by an oil storage pressure signal line L19. Due to this, the detected pressure value of the hydraulic oil detected by the oil storage pressure detector 108 is input as a detection signal to the determination unit 94 of the abnormality monitoring system 92 via the oil storage pressure signal line L19.

The determination unit 94 according to the present embodiment determines whether or not an abnormality has occurred in the opening degree control of the steam turbine valve 31 based on the detected pressure value of the hydraulic oil detected by the oil storage pressure detector 108. When the detected pressure value is larger than a specified value, the determination unit 94 determines that no abnormality has occurred in the opening degree control of the steam turbine valve 31. On the other hand, when the detected temperature value is equal to or less than the specified value, the determination unit 94 determines that an abnormality has occurred in the opening degree control of the steam turbine valve 31.

When the determination unit 94 determines that an abnormality has occurred in the opening degree control of the steam turbine valve 31, the abnormality processing unit 95 performs the abnormality processing in the same manner as in the first embodiment.

In general, the steam turbine valve drive device 40 according to the present embodiment can reduce usage of hydraulic oil as compared with an intensive hydraulic pressure generation device as described above. Therefore, it is desirable that leakage of hydraulic oil can be prevented even if the amount is small.

On the other hand, according to the present embodiment, when the detected pressure value of the hydraulic oil in the oil storage unit 64 is equal to or less than the specified value, it is possible to determine that an abnormality has occurred in the opening degree control of the steam turbine valve 31. This enables the abnormality processing unit 95 of the abnormality monitoring system 92 to perform abnormality processing and to issue an alarm. When an alarm is issued, it is possible to notify the operator that an abnormality of pressure drop of the hydraulic oil in the oil storage unit 64 occurs and there is a concern about leakage of the hydraulic oil. Thereafter, the steam turbine 3 can be safely stopped by the operator. In addition, the steam turbine 3 can be safely stopped also when the abnormality processing unit 95 issues a stop command of the steam turbine 3.

For example, if the oil storage unit 64 includes an accumulator, a decrease in the pressure of the hydraulic oil in the oil storage unit 64 means a decrease in the storage amount of the hydraulic oil in the oil storage unit 64. Thus, leakage of hydraulic oil in the oil storage unit 64 can be monitored by monitoring the pressure of the hydraulic oil in the oil storage unit 64. Therefore, it is possible to prevent leakage of the hydraulic oil in the oil storage unit 64, and it is possible to prevent reduction of the amount of the hydraulic oil in the oil storage unit 64. If the oil storage unit 64 includes an accumulator, leakage of air in the oil storage unit 64 can be monitored by monitoring the pressure of the hydraulic oil in the oil storage unit 64.

Eighth Embodiment

Next, the steam turbine valve abnormality monitoring system, the steam turbine valve drive device, the steam turbine valve device, and the steam turbine plant according to the eighth embodiment will be described with reference to FIG. 9.

Figure 9:
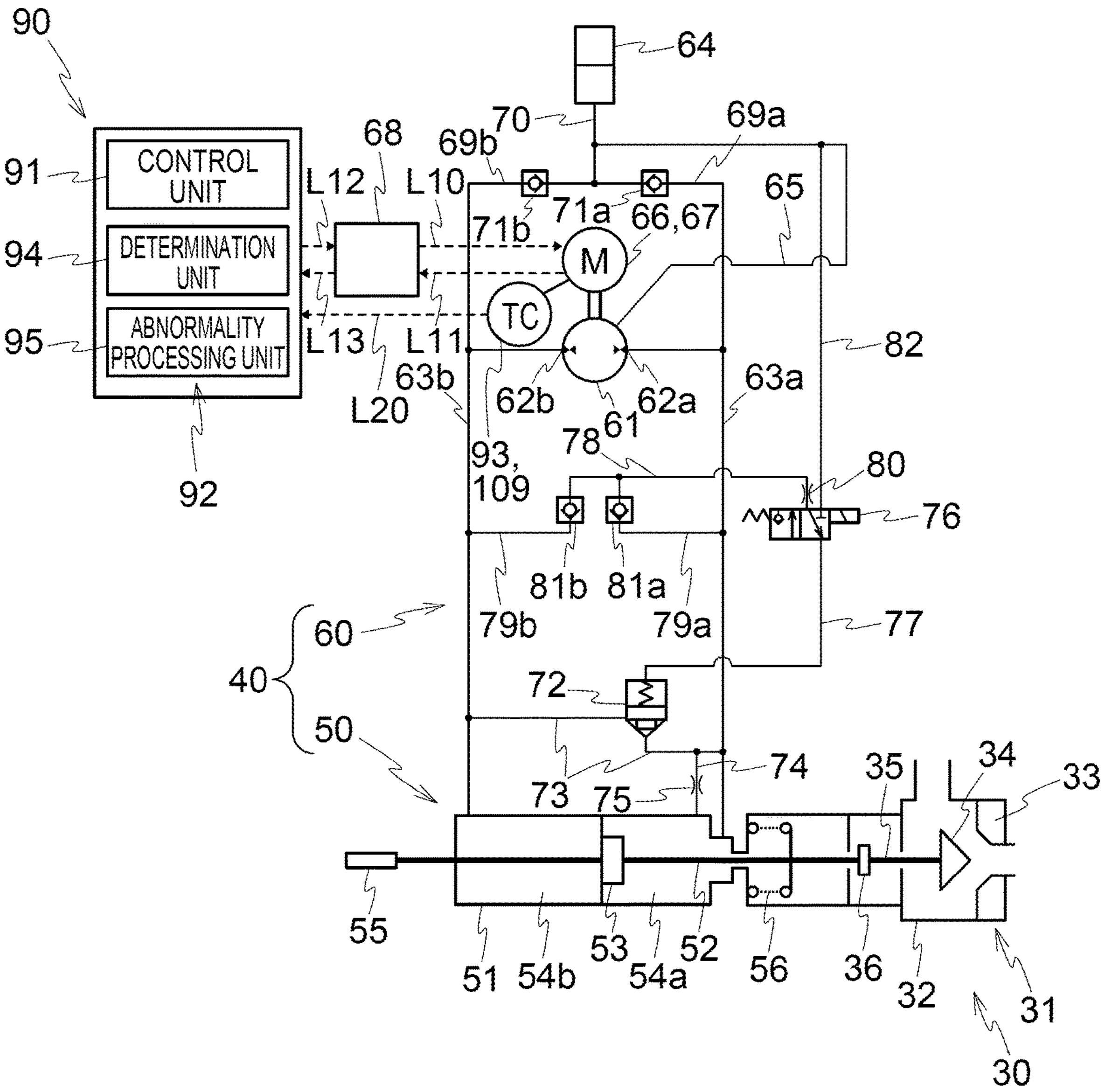
FIG. 9 shows a steam turbine valve abnormality monitoring system according to an eighth embodiment.

In the eighth embodiment illustrated in FIG. 9, a main different from the first embodiment illustrated in FIGS. 1 and 2 lies in that it is determined that an abnormality has occurred in the opening degree control of the steam turbine valve when the detected temperature value of the servomotor is equal to or greater than a specified value. Other configurations are substantially the same as those of the first embodiment illustrated in FIGS. 1 and 2. Note that in FIG. 9, the same parts as those in the first embodiment illustrated in FIGS. 1 and are given the same reference numerals, and detailed description thereof is omitted.

As illustrated in FIG. 9, in the steam turbine valve drive device 40 according to the present embodiment, the detection unit 93 includes a motor temperature detector 109 detecting the temperature of the servomotor 66. The detection unit 93 according to the present embodiment is configured to detect the temperature of the servomotor 66 as an example of the state of the steam turbine valve drive device 40. The motor temperature detector 109 may be incorporated into the servomotor 66. The motor temperature detector 109 and the determination unit 94 of the abnormality monitoring system 92 are connected by a motor temperature signal line L20. Due to this, the detected temperature value of the servomotor 66 detected by the motor temperature detector 109 input as a detection signal to the determination unit 94 of the abnormality monitoring system 92 via the motor temperature signal line L20.

The determination unit 94 according to the present embodiment determines whether or not an abnormality has occurred in the opening degree control of the steam turbine valve 31 based on the detected temperature value of the servomotor 66 detected by the motor temperature detector 109. When the detected temperature value is smaller than a specified value, the determination unit 94 determines that no abnormality has occurred in the opening degree control of the steam turbine valve 31. On the other hand, when the detected temperature value is equal to or greater than the specified value, it is determined that an abnormality has occurred in the opening degree control of the steam turbine valve 31.

When the determination unit 94 determines that an abnormality has occurred in the opening degree control of the steam turbine valve 31, the abnormality processing unit 95 performs the abnormality processing in the same manner as in the first embodiment.

In general, when the opening/closing operation of the steam turbine valve 31 is repeated or feedback control is performed to increase the pressure of the hydraulic oil in the oil chamber, the current flowing through the servomotor 66 increases. This increases the heat generation amount of the servomotor 66. It is considered that temperature rise of the servomotor 66 causes damage to the motor winding, damage to the sealant of the bidirectional pump 61, and the like.

On the other hand, according to the present embodiment, when the detected temperature value of the servomotor 66 is equal to or greater than the specified value, it is possible to determine that an abnormality has occurred in the opening degree control of the steam turbine valve 31. This enables the abnormality processing unit 95 of the abnormality monitoring system 92 to perform abnormality processing and to issue an alarm. When an alarm is issued, it is possible to notify the operator that an abnormality of temperature rise of servomotor 66 and there is a concern about damage to the servomotor 66, the bidirectional pump 61, and the like. Thereafter, the steam turbine 3 can be safely stopped by the operator. In addition, the steam turbine 3 can be safely stopped also when the abnormality processing unit 95 issues a stop command of the steam turbine 3.

For example, when the steam turbine valve drive device 40 according to the present embodiment is used in an area where the temperature is relatively high, the temperature of the servomotor 66 can get high. By performing abnormality processing such as issuing an alarm when the detected temperature value of the servomotor 66 has risen to equal to or greater than the specified value as in the present embodiment, it is possible to effectively prevent damage of the servomotor 66, the bidirectional pump 61, and the like even in an area where the temperature is relatively high.

The steam turbine valve abnormality monitoring system 92 according to each embodiment described above may be combined. In this case, based on a plurality of states of the steam turbine valve drive device 40, it is possible to determine whether or not an abnormality has occurred in the opening degree control of the steam turbine valve 31.

According to each embodiment described above, it is possible to improve the reliability when an abnormality occurs.

While some embodiments of the present invention have been described, these embodiments are presented by way of example and are not intended to limit the scope of the invention. These novel embodiments can be implemented in various other forms, and various omissions, substitutions, and modifications can be made without departing from the gist of the invention. These embodiments and modifications thereof are included in the scope and the gist of the invention, and are also included in the claimed invention and the scope equivalent thereof. As a matter of course, it is also possible to appropriately combine these embodiments in part within the gist of the present invention.

The invention claimed is:

1. A steam turbine valve abnormality monitoring system that monitors an abnormality in opening degree control of a steam turbine valve driven by a steam turbine valve drive device including: a cylinder housing a piston disposed on an operating rod operating the steam turbine valve and having a load side oil chamber and an unload side oil chamber partitioned by the piston; a bidirectional pump that selectively supplies hydraulic oil to the load side oil chamber and the unload side oil chamber; a servomotor that drives the bidirectional pump; a control unit that controls the servomotor; and an oil storage unit supplied with the hydraulic oil leaked from the bidirectional pump, the steam turbine valve abnormality monitoring system comprising:

a detection unit that detects a state of the steam turbine valve or the steam turbine valve drive device;

a determination unit that determines whether or not the abnormality has occurred in opening degree control of the steam turbine valve based on a detected result of the detection unit; and an abnormality processing unit that issues an alarm or issues a stop command of a steam turbine when the determination unit determines that the abnormality has occurred in opening degree control of the steam turbine valve, wherein the steam turbine valve drive device further includes a servo driver that performs feedback control of the servomotor based on a command rotation speed received from the control unit and an actual rotation speed received from the servomotor, the servo driver is configured to be switchable between an ON state in which the feedback control is performed and an OFF state in which the feedback control is not performed, the detection unit detects whether the servo driver is in the ON state or whether the servo driver is in the OFF state, and the determination unit determines that the abnormality has occurred in opening degree control of the steam turbine valve when the detection unit detects that the servo driver is in the OFF state.

2. The steam turbine valve abnormality monitoring system according to claim 1, wherein the steam turbine valve drive device further includes a closing solenoid valve that discharges the hydraulic oil from the load side oil chamber in an emergency, and the abnormality processing unit issues a command to the closing solenoid valve so as to discharge the hydraulic oil from the load side oil chamber when the determination unit determines that the abnormality has occurred in opening degree control of the steam turbine valve.

3. A steam turbine valve drive device driving a steam turbine valve, the steam turbine valve drive device comprising:

a cylinder housing a piston disposed on an operating rod operating the steam turbine valve and having a load side oil chamber and an unload side oil chamber partitioned by the piston;

a bidirectional pump that selectively supplies hydraulic oil to the load side oil chamber and the unload side oil chamber;

a servomotor that drives the bidirectional pump;

a control unit that controls the servomotor;

an oil storage unit supplied with the hydraulic oil leaked from the bidirectional pump; and a steam turbine valve abnormality monitoring system according to claim 1.

4. A steam turbine valve device, comprising:

a steam turbine valve; and a steam turbine valve drive device according to claim 3 that drives the steam turbine valve.

5. A steam turbine plant, comprising:

a boiler generating steam;

a steam turbine that obtains a rotational drive force by the steam generated by the boiler;

a condenser that condenses the steam discharged from the steam turbine; and a steam turbine valve device according to claim 4 that controls a flow of the steam generated by the boiler.

6. A steam turbine valve abnormality monitoring system that monitors an abnormality in opening degree control of a steam turbine valve driven by a steam turbine valve drive device including: a cylinder housing a piston disposed on an operating rod operating the steam turbine valve and having a load side oil chamber and an unload side oil chamber partitioned by the piston; a bidirectional pump that selectively supplies hydraulic oil to the load side oil chamber and the unload side oil chamber; a servomotor that drives the bidirectional pump; a control unit that controls the servomotor; and an oil storage unit supplied with the hydraulic oil leaked from the bidirectional pump, the steam turbine valve abnormality monitoring system comprising:

a detection unit that detects a state of the steam turbine valve or the steam turbine valve drive device;

a determination unit that determines whether or not the abnormality has occurred in opening degree control of the steam turbine valve based on a detected result of the detection unit; and an abnormality processing unit that issues an alarm or issues a stop command of a steam turbine when the determination unit determines that the abnormality has occurred in opening degree control of the steam turbine valve, wherein the abnormality processing unit issues a stop command for closing another steam turbine valve installed on an upstream side relative to the steam turbine valve in a steam flow path in which the steam turbine valve is installed, when the determination unit determines that the abnormality has occurred in opening degree control of the steam turbine valve.

* * * * *